United States Patent
Ward et al.

(10) Patent No.: US 9,334,012 B1
(45) Date of Patent: May 10, 2016

(54) BRAKE SAFETY APPARATUS

(71) Applicants: Gregory Alan Ward, Pasadena, CA (US); Wen Hsieh, Rancho Dominguez, CA (US)

(72) Inventors: Gregory Alan Ward, Pasadena, CA (US); Wen Hsieh, Rancho Dominguez, CA (US)

( * ) Notice: Subject to any disclaimer, the term of this patent is extended or adjusted under 35 U.S.C. 154(b) by 0 days.

(21) Appl. No.: 14/621,256

(22) Filed: Feb. 12, 2015

Related U.S. Application Data

(63) Continuation-in-part of application No. 14/026,368, filed on Sep. 13, 2013, now abandoned.

(51) Int. Cl.
| | | |
|---|---|---|
| *B62L 3/00* | (2006.01) | |
| *B62L 3/02* | (2006.01) | |
| *B62L 1/10* | (2006.01) | |

(52) U.S. Cl.
CPC .... *B62L 3/02* (2013.01); *B62L 1/10* (2013.01)

(58) Field of Classification Search
CPC .......... B62L 3/00; B62K 23/00; B62M 25/02; B60T 11/046; B60T 11/06; B60T 8/3225
USPC ........... 188/2 D, 24.11–24.22; 74/489, 500.5, 74/501.5 R, 501.6, 502.4, 502.5, 502.6
See application file for complete search history.

(56) References Cited

U.S. PATENT DOCUMENTS

| | | | | |
|---|---|---|---|---|
| 5,674,142 A | * | 10/1997 | Jordan ................... | B62K 23/00 474/80 |
| 5,765,446 A | * | 6/1998 | Patterson ............... | B62M 25/02 74/501.5 R |
| 6,311,805 B1 | * | 11/2001 | Juan ........................ | B60T 11/06 188/2 D |
| 7,104,155 B2 | * | 9/2006 | Nilsson ................. | B60T 11/046 74/502.2 |
| 8,261,887 B2 | * | 9/2012 | Tseng ..................... | B60T 11/06 188/2 D |
| 2012/0234633 A1 | * | 9/2012 | Lu .......................... | B60T 8/3225 188/24.22 |
| 2015/0075920 A1 | * | 3/2015 | Ward ....................... | B62L 3/00 188/24.11 |

\* cited by examiner

*Primary Examiner* — Christopher Schwartz
(74) *Attorney, Agent, or Firm* — Cotman IP Law Group, PLC

(57) ABSTRACT

A brake safety apparatus that prevents an over the handlebar accident caused by applying too much brake force to the front brake of a bicycle is presented. The present invention works by effectively extending the length of the brake cable connected between the brake lever and the brake caliper on the front brake of a bicycle. An embodiment of brake release system comprises a brake cable housing coupled to a piston at a distal end of the lumen of a housing. The piston resides within the lumen of the housing. Between the piston and the proximal end of the housing is a compression spring with a desired spring rate and a preload breakout force. The proximal end of the housing is fixedly coupled to the front braking system of a bicycle.

20 Claims, 27 Drawing Sheets

BRAKE SAFETY APPARATUS

CROSS-REFERENCE TO RELATED APPLICATIONS

The present application is a continuation-in-part of U.S. patent application Ser. No. 14/026,368 filed on Sep. 13, 2013, specification of which is herein incorporated by reference for completeness of disclosure.

BACKGROUND OF THE INVENTION

1. Field of the Invention

Embodiments of the invention relates to the field of braking power control for a two wheel vehicle. More specifically, the invention relates to a system for the reduction of the braking power by releasing brake cable tension and thereby preventing over the handlebar accidents due to excessive brake force.

2. Description of the Related Art

Braking systems have improved as materials and engineering know-how have evolved. All brakes, regardless of the mechanism, share a common thing that they increase the amount of brake friction allowing the rider to slow down or stop. Most brake problems result from excessive friction or poor installation of the cables or poor quality brakes. Traditional cantilever brakes used two cables, a main cable running down the centerline of the bike, and a second, transverse cable connecting the cantilever units on each side of the wheel. The main cable would pull upward on the middle of the transverse cable, causing the cantilever units to rotate inward. The operation of like brake systems such as applying the front brake only with too much pressure can lock up the front wheel and cause a forward rollover accident.

Conventional brake levers used with direct-pull cantilevers will not pull enough cable to stop in wet conditions without bottoming out against the handlebars. In dry conditions, they either won't work, or will grab too suddenly. The bicycle brake has been redesigned over the years to provide the rider with increased braking power. However, this increased braking power may be difficult for the inexperienced rider to control. Specifically, a bicycle brake with a very large braking power can possibly cause the bicycle wheel to lock up. This may cause the bicycle to skid for the inexperienced rider. With any braking system, failure to properly adjust, maintain, and use your brakes may result in a loss of control and injury.

One of the existing systems for reducing braking power describes a braking power modulator for a bicycle brake device. More specifically, the present invention relates to an adjustable braking power modulator, which can be mounted midway along a brake cable of a bicycle brake device to modulate the braking power corresponding to a stroke of an inner wire of the brake cable. The adjustable braking power modulator provides different braking powers to meet the needs of different riders or different road conditions. However, this system cannot be operated in all weather conditions. The system is not cost effective or convenient for use.

Another existing system for reducing braking power discloses a cable connecting apparatus that includes a cable sleeve adapted to receive the outer casing of a control cable; a guide having a first end portion and a second end portion for movably supporting the cable sleeve; and a biasing device for biasing the cable sleeve toward the second end portion of the guide. In another device, a connecting member is provided for connecting a portion of a first inner wire located between a first outer casing and a second outer casing to a portion of a second inner wire disposed between a third outer casing and a fourth outer casing, wherein the connector moves together with the first inner wire and the second inner wire. A position confirmation means allows the position of at least one of the first outer casing, the second outer casing, the third outer casing and the fourth outer casing to be visually confirmed. The system does not provide simple and reliable design.

Another existing system provides a device for a two wheeled vehicle with two independent cable operated brake systems consisting of two pivoting levers connecting the two cables operating the brake calipers via cables enclosed in casings from the hand lever to the calipers, one operating the front brake and one operating the rear brake. Regardless of which or both hand levers are applied first, the rear brake will be actuated before and with more force that to the front brake through the offset pivot point of the two levers, the fulcrum action will alter the length of the casing relative to the cable length of one brake and by tension transfer the differences of casing length to cable length on the opposite side and apply the brakes rear first with more force than front brake.

Various other systems exist that reduce the brake power of a two wheel vehicle. One such system is a braking power modulator for a bicycle brake device. More specifically, the present invention relates to an adjustable braking power modulator, which can be mounted midway along a brake cable of a bicycle brake device to modulate a braking power corresponding to a stroke of an inner wire of the brake cable. The adjustable braking power modulator provides different braking powers to meet the needs of different riders or different road conditions. Various other systems use a spring to limit the force that a brake lever can transmit to a brake caliper. This is done by placing a spring on one end of a brake cable at either the lever end or the caliper end. When the rider moves the brake lever, some of the force is used to move the spring, not the brake cable, thus limiting the amount of force the brake cable transmits to the brake caliper. The disadvantage of these systems is that the braking power is limited all the time so that the performance of the braking system is limited. Thus the safety of the braking system is reduced.

Based on the foregoing, there is a need for a system that would prevent over the handlebar accidents when the front brake is applied too rapidly or aggressively. Such a needed system would reset automatically. Such a needed system would provide a simple and reliable design. Further, the system could be operated in all weather conditions. The system would require no adjustment or maintenance over time. Such a system would be installed in all types of bicycles and anywhere in a bicycle brake system. Finally, the system would be cost effective and convenient for use. The present invention overcomes prior art shortcomings by accomplishing these critical objectives.

BRIEF SUMMARY OF THE INVENTION

One or more embodiments of the present invention comprise a device for brake power reduction in two-wheel vehicles.

Embodiments of the present invention comprise a brake safety device that prevents over the handlebar accidents caused by aggressive and rapid braking of the front brake of bicycles. One or more embodiments of the invention comprise a brake cable and brake cable housing held by a piston. The piston is contained in the brake safety device housing along with a spring. The housing is made of a walled tubing with one end closed to retain the spring and to connect the brake caliper noodle to the brake safety device housing. The spring and piston are retained in the brake safety device housing at the opposite end by a push-in lock washer.

The brake safety device works by extending the length of the brake cable between the brake lever and the brake caliper on the front brake of a bicycle. The method of extending the brake cable is to move the brake cable housing. The brake cable is routed through the center of the brake safety device. This center routing eliminates any additional side loads or friction on the brake cable from the brake safety device during normal operation. The front brake feels the same to the rider during normal operation when the brake safety device is installed on the bicycle.

The front brake of the bicycle operates normally until the force from the brake lever exceeds a preset level. 100% of the braking power of the front brake is available to the rider until the preset level is exceeded. When the force from the brake lever exceeds the preset level, the spring inside the brake safety device housing compresses and allows the brake cable housing to move. This extends the length of the brake cable reducing the power of the brake.

The spring preload determines the force from the brake lever that will allow the brake cable housing to move. The preload force varies for the different types of cable actuated bicycle brakes including linear pull brakes, caliper brakes, cantilever brakes and disc brakes. The force is determined by testing the different types of brakes with a brake safety device on a bicycle and finding the highest preload that will not allow the rear wheel to come off the ground when the front brake is applied aggressively and the brake lever is pulled all the way to the handlebar.

The spring rate determines how much braking power will be available after the brake safety device is activated. Up to 95% of the maximum safe braking power can be available after activation of the brake safety device by increasing the spring rate. The maximum safe braking power of the front brake is the shortest distance the bicycle can stop in without lifting the rear wheel off the ground when there is no brake safety device installed.

The brake safety device housing and spring must be of sufficient length to allow the brake cable housing and brake cable to extend enough to allow the brake lever to move all the way to the handlebar when the brake safety device is activated. This should include a spring of sufficient length not to fatigue the spring.

The brake safety device is a mechanism for bicycles with cable actuated brakes. The brake safety device prevents over the handlebar accidents caused by the aggressive and rapid application of the front brake. The front brake works normally providing 100% of the braking power until a preset level of brake lever force is reached. When the preset level is exceeded, the brake safety device partially releases the front brake, the brake lever moves all the way to the handlebar and the over the handlebar accident is prevented.

The brake safety device is automatically reset when the brake lever is released. The brake safety device is a simple and reliable mechanical device. It has high reliability with no moving parts during normal braking. The brake safety device is an enclosed design that can operate for years in all weather conditions. No adjustments or maintenance is needed over time. It is easy to confirm the brake safety device is working by aggressively squeezing the brake lever to see that it moves all the way to the handlebar. The brake safety device works with all types of bicycles with cable actuated brakes including linear pull brakes, caliper brakes, cantilever brakes and disc brakes. The brake safety device can be installed anywhere in the bicycle brake system including at the brake lever, the brake caliper or anywhere along the brake cable route.

The present embodiment is easy to install on new bicycles and can be retrofitted to existing bicycles. The brake safety device is cost efficient. Other features and advantages of the present invention will become apparent from the following detailed description, taken in conjunction with the accompanying drawings, which illustrate, by way of example, the principles of the invention.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising a brake safety apparatus will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment, or an embodiment combining software and hardware aspects such as when the brake release system is used in conjunction with a computer to form an antiskid system. The following detailed descriptions should not be taken in a limiting sense.

Figure 1A:
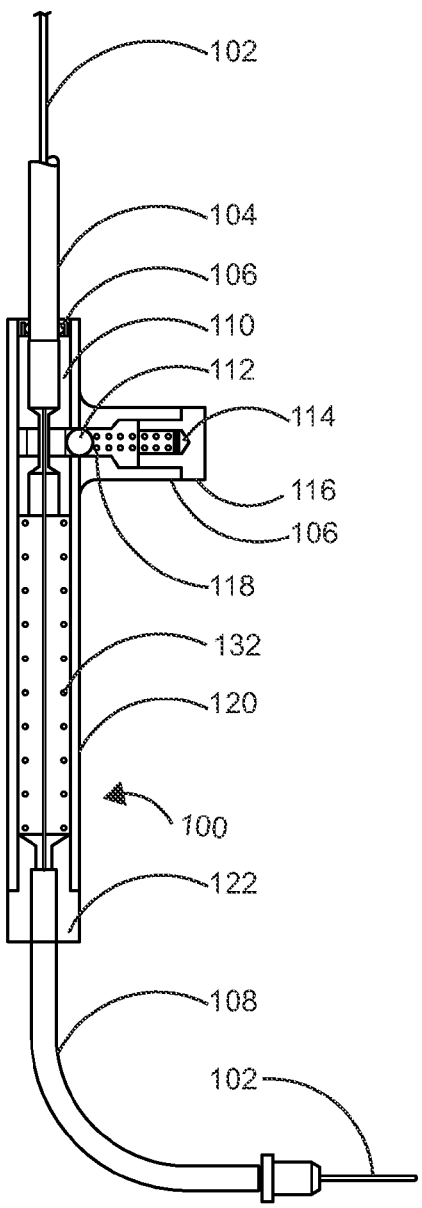
FIGS. 1A and 1B is a cut-away perspective view of a brake release system in accordance with a preferred embodiment of the present invention for bicycles with linear pull brakes.
Figure 1B:
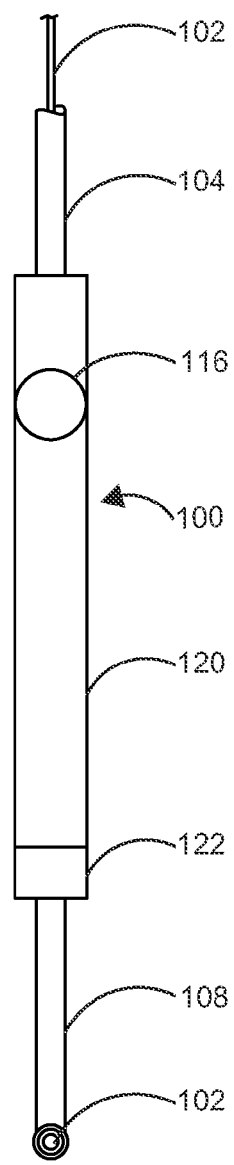

FIGS. 1A, 1B, 2A, 2B, 3A, 3B, 4A and 4B are of the same configuration except for the changeable end cap. The end cap is changed so the brake release system can be adapted to the many different kinds of bicycle brake systems that have cable actuated brakes. Referring to FIGS. 1A and 1B, the cut-away orthographic views of a brake release system 100 in accordance with a preferred embodiment of the present invention are illustrated and this configuration is for bikes with linear pull brakes. The brake release system 100 comprises a brake cable 102, a brake cable housing 104 held by a piston 110. The piston 110 is held in the latched position by the hardened steel ball 112. The hardened steel ball 112 is pushed into the groove in the piston 110 and held in place by compression spring 118. The amount of spring force on the hardened steel ball 112 and the amount of the hardened steel ball 112 that is engaged in the groove determines the release force. The brake cable housing 104 is held in place by the piston 110. When the brake cable 102 is pulled quickly and the longitudinal force on the piston 110 reaches the release force, the piston 110 slides down the bore in the housing 120. This action partially releases the brakes. An O-ring 106 is available to keep water and debris from entering the brake release housing 120. Pluralities of washers 114 are available inside the cap 116 to adjust the force of compression spring 118 on the hardened steel ball 112 pushing against the piston 110. Compression spring 118 is seen inside the cap 116. The wall tubing of housing 120 is also available in the brake release system. When the brake release system partially releases the brake, compression spring 132 pushes piston 110 back to the latched position when the brake lever is released. This action automatically resets the brake release system. A changeable end cap 122 is connected to the brake release housing 120. The curved portion of noodle 108 for V-brakes (e.g. linear pull brakes, see FIG. 5A) is attached to changeable end cap 122 and is shown in FIG. 1A.

Figure 2A:
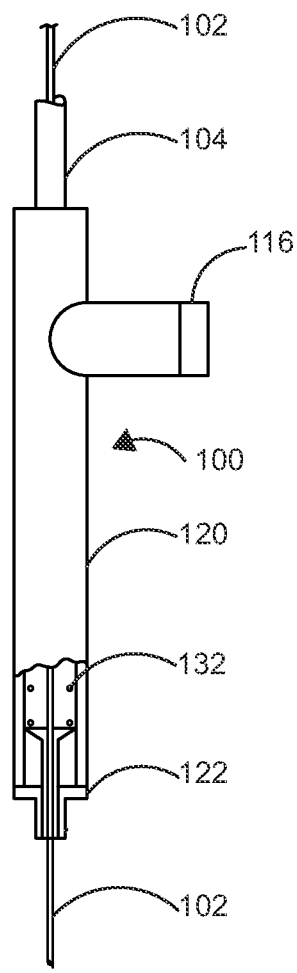
FIGS. 2A and 2B is a partial cut-away perspective view of the brake release system of the present invention for bicycles with mechanical disc brakes, caliper brakes or cantilever brakes.
Figure 2B:
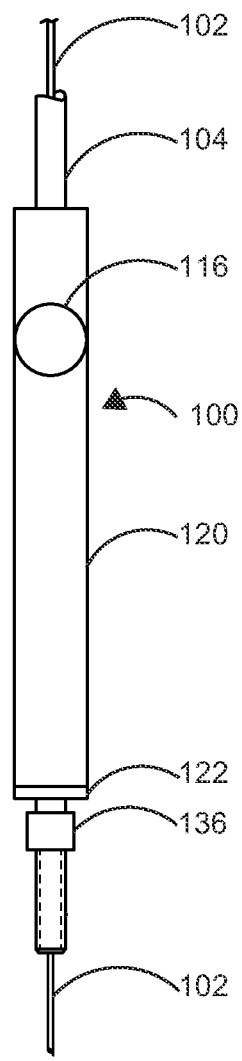

FIGS. 2A and 2B show the partial cut-away orthographic views of the brake release system 100. This configuration is for mounting the brake release system on mechanical disc brakes, caliper brakes and cantilever brakes. The brake cable 102 of the brake release system 100 is shown at the top and bottom of the brake release system 100. A brake cable housing 104 at the top of the brake release system 100 is shown in FIG. 2A. A cap 116 is also shown in FIG. 2A. A wall tubing housing 120, the compression spring 132, the changeable end cap 122 and the adapter 124 is also shown in FIG. 2A. In FIG. 2B the threaded adapter 136 that is part of the brake caliper is shown mating to the changeable end cap 122.

The brake release system 100 comprises the brake cable 102, a brake cable housing 104 held by piston 110 (not shown). Piston 110 is held in the latched position by the hardened steel ball 112 (not shown). The hardened steel ball 112 is pushed into the groove in the piston 110 and held in place by a compression spring 118 (not shown). Compression spring 118 is used to push the hardened steel ball 112 against the piston 110. The amount of spring force on the hardened steel ball 112 and the amount of the hardened steel ball 112 that is engaged in the groove determines the release force. The brake cable housing 104 is held in place by the piston 110. When the brake cable 102 is pulled quickly and the longitudinal force on the piston 110 reaches the release force, the piston 110 slides down the bore in the housing 120. This action partially releases the brakes. An O-ring (not shown) keeps water and debris from entering housing 120. Pluralities of washers (not shown) are available inside the cap 116. When the brake release system partially releases the brake, compression spring 132 pushes piston 110 back to the latched position when the brake lever is released. This action automatically resets the brake release system.

Figure 3A:
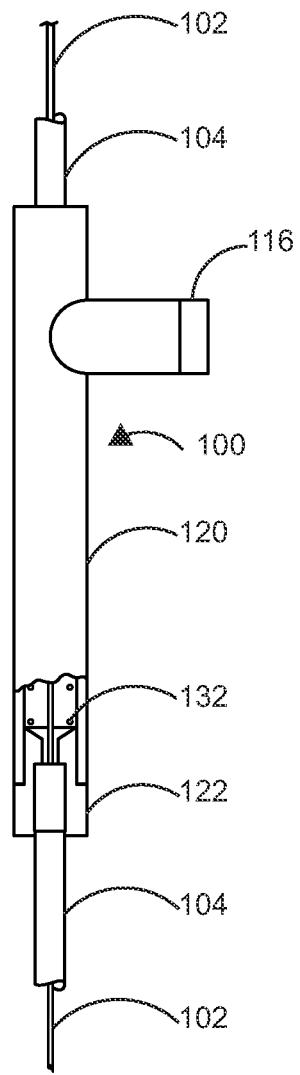
FIGS. 3A and 3B is a partial cut-away perspective view of the brake release system of the present invention for any bicycle with cable actuated brakes where the brake release system can be mounted anywhere along the brake cable route.
Figure 3B:
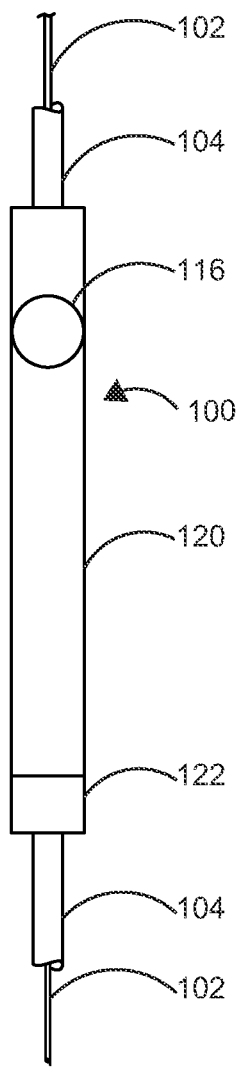

FIGS. 3A and 3B show the partial cut-away orthographic views of the brake release system 100. This configuration is for mounting the brake release system anywhere along the brake cable route. The brake cable 102 of the brake release system 100 is shown at the top and bottom of the brake release system 100. A brake cable housing 104 at the top and bottom of the brake release system 100 is shown in FIG. 3A. A cap 116 is also shown in FIG. 3A. A wall tubing housing 120, the compression spring 132 and the changeable cap 122 is also shown in FIG. 3A. The cable housing adapter 122, is sized to accept cable housing 104.

The brake release system 100 comprises the brake cable 102, a brake cable housing 104 held by a piston 110 (not shown). The piston is held in the latched position by the hardened steel ball 112 (not shown). The hardened steel ball 112 is pushed into the groove in the piston and held in place by a compression spring 118 (not shown). Compression spring 118 is used to push the hardened steel ball 112 against the piston 110. The amount of spring force on the hardened steel ball 112 and the amount of the hardened steel ball 112 that is engaged in the groove determines the release force. The brake cable housing 104 is held in place by piston 110. When the brake cable 102 is pulled quickly and the longitudinal force on the piston 110 reaches the release force, the piston 110 slides down the bore in the housing 120. This action partially releases the brakes. An O-ring (not shown) keeps water and debris from entering housing 120. Inside the cap 116 shown in FIG. 3A pluralities of washers (not shown) are available to adjust the force exerted by compression spring 118 on hardened steel ball 112. When the brake release system partially releases the brake, compression spring 132 pushes piston 110 back to the latched position when the brake lever is released. This action automatically resets the brake release system.

Figure 4A:
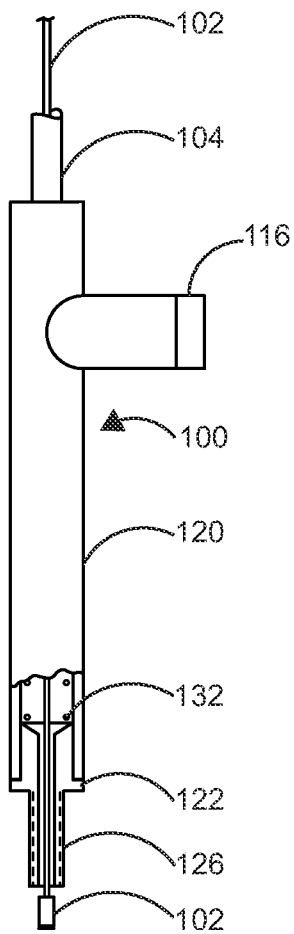
FIGS. 4A and 4B is a partial cut-away perspective view of the brake release system of the present invention for bicycles with cable actuated brakes where the brake release system is mounted to the brake lever housing.
Figure 4B:
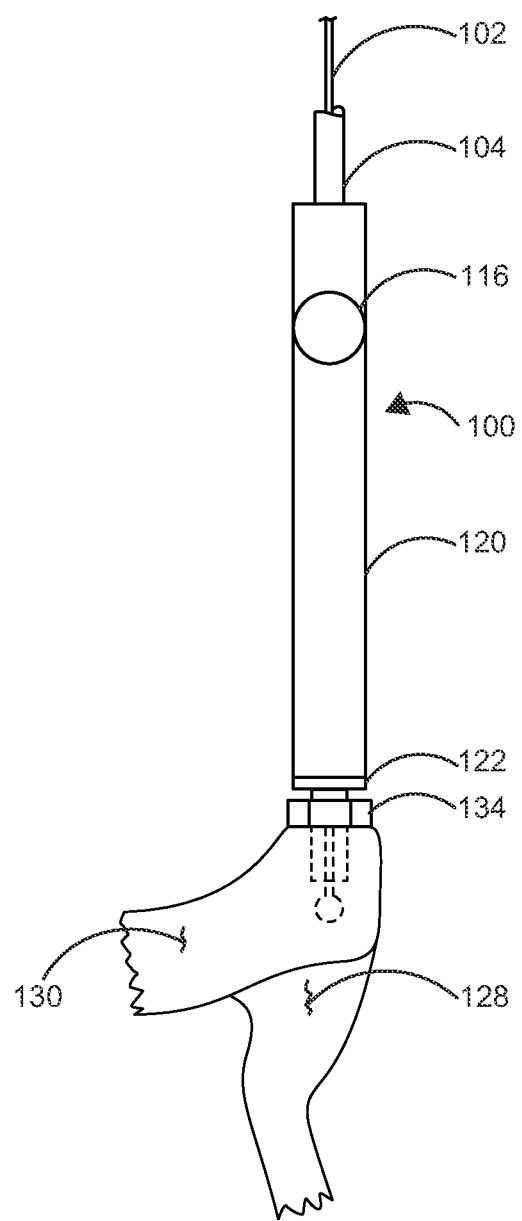

FIGS. 4A and 4B show the partial cut-away orthographic views of the brake release system 100. This configuration is for mounting the brake release system directly to the brake lever housing. The brake cable 102 of the brake release system 100 is shown at the top and bottom of the brake release system 100. A brake cable housing 104 at the top of the brake release system 100 is shown in FIG. 4A. The changeable end cap 122 that has threads 126 is also shown in FIG. 4A. Threads 126 on changeable end cap 122 allow the brake release system to be attached directly to the brake lever housing 130. Jam nut 134 locks the brake release system to the brake lever housing 130. A wall tubing housing 120 and the compression spring 132 are also shown in FIG. 4A. The brake lever 128 is shown in FIG. 4B.

The brake release system 100 comprises the brake cable 102, a brake cable housing 104 held by a piston 110 (not shown). The piston is held in the latched position by the hardened steel ball 112 (not shown). The hardened steel ball 112 is pushed into the groove in the piston and held in place by compression spring 118 (not shown). The compression spring is used to push the hardened steel ball 112 against the piston 110. The amount of spring force on the hardened steel ball 112 and the amount of the hardened steel ball 112 that is engaged in the groove of piston 110 determines the release force. The brake cable housing 104 is held in place by the piston 110. When the brake cable 102 is pulled quickly by brake lever 128 and the longitudinal force on the piston 110 reaches the release force, the piston 110 slides down the bore in the housing 120. This action partially releases the brakes. An O-ring (not shown) keeps water and debris from entering the brake release housing 120. Inside the cap 116 shown in FIG. 4A pluralities of washers (not shown) are available to adjust the force spring 118 pushes against hardened steel ball 112. When the brake release system partially releases the brake, compression spring 132 pushes piston 110 back to the latched position when brake lever 128 is released. This action automatically resets the brake release system.

The brake release system 100 has no moving parts during normal braking thus giving it high reliability. There are no batteries to maintain and no adjustments to be made. The front brake operates normally when the brake is applied smoothly. When the front brake is applied abruptly and aggressively in a panic stop situation, the front brake is released at approximately half of its maximum braking power. This prevents the rider from decelerating too quickly and possibly going over the handlebar. When the brake is released, the front brake is still operating with approximately 33% of the braking power being applied. The front brake automatically resets when the brake lever 128 is released by the rider. The brake release system 100 is also beneficial to any two wheel vehicles with cable actuated brakes that are prone to over the handlebar accidents. This includes electric bikes, electric scooters and small motor bikes. The brake release system 100 can also be used to limit the force being applied to any device using a flexible cable in a flexible housing.

The brake release system 100 works by extending the length of the brake cable 102 connected between the brake lever 128 and the brake caliper (not shown) on the front brake of a bicycle. The method of extending the brake cable 102 is to release the brake cable housing 104. The brake release system 100 routes the brake cable 102 through the center of the brake release system 100. This eliminates any additional side loads or friction on the brake cable 102 during normal braking operation. The brake will feel the same to the rider during normal operation when the brake release system 100 is installed on the bicycle.

Piston 100 (not shown) is used to hold the brake cable housing 104. A hardened steel ball 112 is used to keep the piston from moving and releasing the brake cable 102. A spring 118 is used to push the hardened steel ball 112 against the piston. The amount of engagement of the hardened steel ball 112 with the piston and the spring force determine the release force. When the brake is applied smoothly, the ball 112 and piston can resist approximately two and a half times the brake lever 128 load compared to when the rider aggressively applies the brake lever 128 with the resulting shock load on the ball 112 and piston. When the brake is applied smoothly, about 90% of the braking power can be achieved. When the brake is applied aggressively and rapidly, the brake release at about 50% of its braking power.

The brake release system 100 can be located anywhere along the path of the brake cable 102. It can be connected to the brake lever housing 130, the brake caliper (not shown) or anywhere along the brake cable 102 route. There is no cutting of the brake cable 102 or brake cable housing 104. It is easy to confirm that the brake release system 100 is operational by simply squeezing the brake lever 128 quickly to see that the front brake releases. The brake release system 100 is a simple design and is cost efficient.

One or more embodiments of the brake safety apparatus of the present invention will now be described in detail with reference to FIGS. 5A-C, 6A-C, 7A-C, 8A-C, 9A-E, 10, 11, 12A-B, 13 and 14.

Figure 5A:
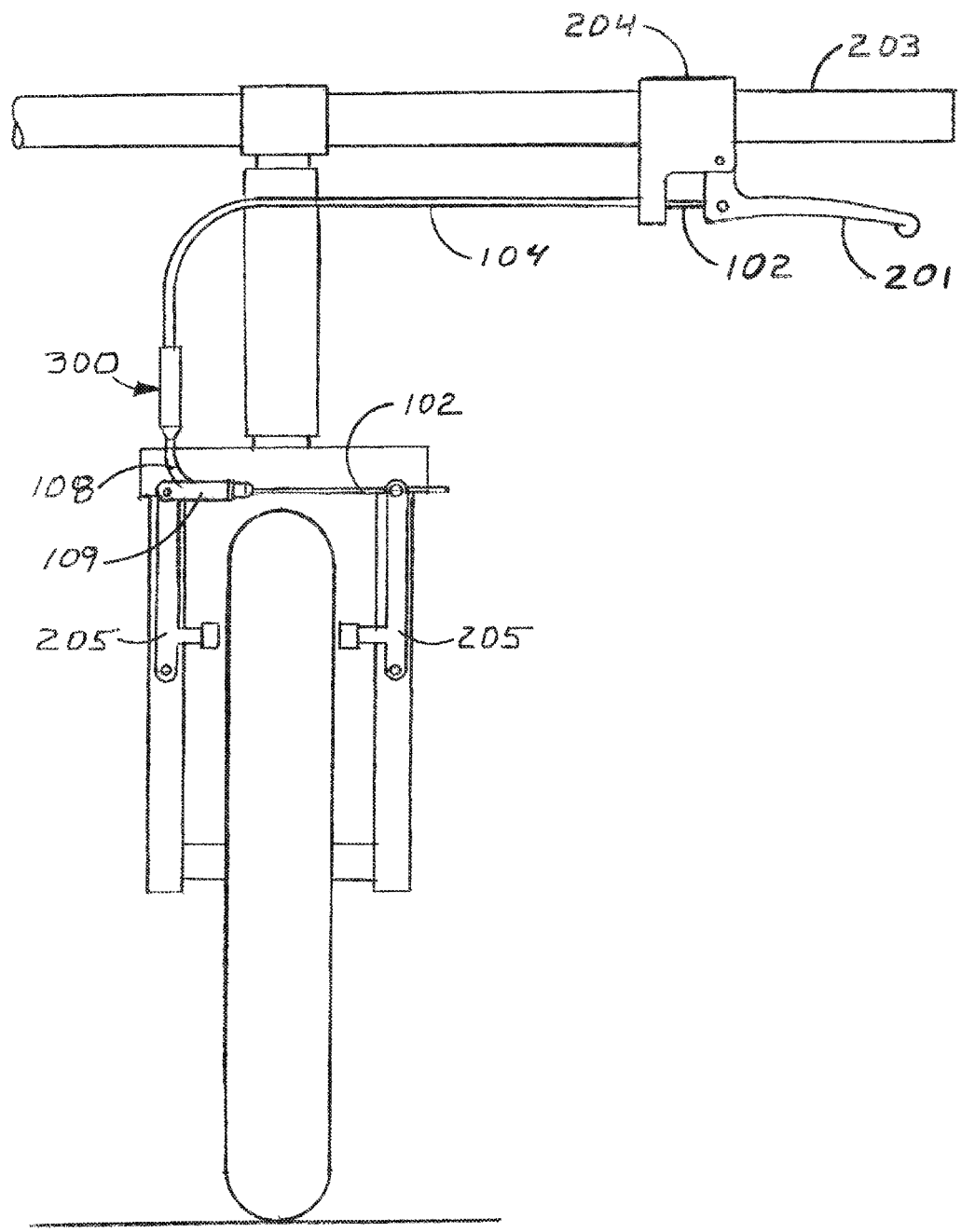
FIGS. 5A, 5B and 5C are perspective views of the possible locations of the brake safety device in the front brake system of a bicycle with cable actuated linear pull brakes in accordance with one or more embodiments of the present invention.
Figure 5B:
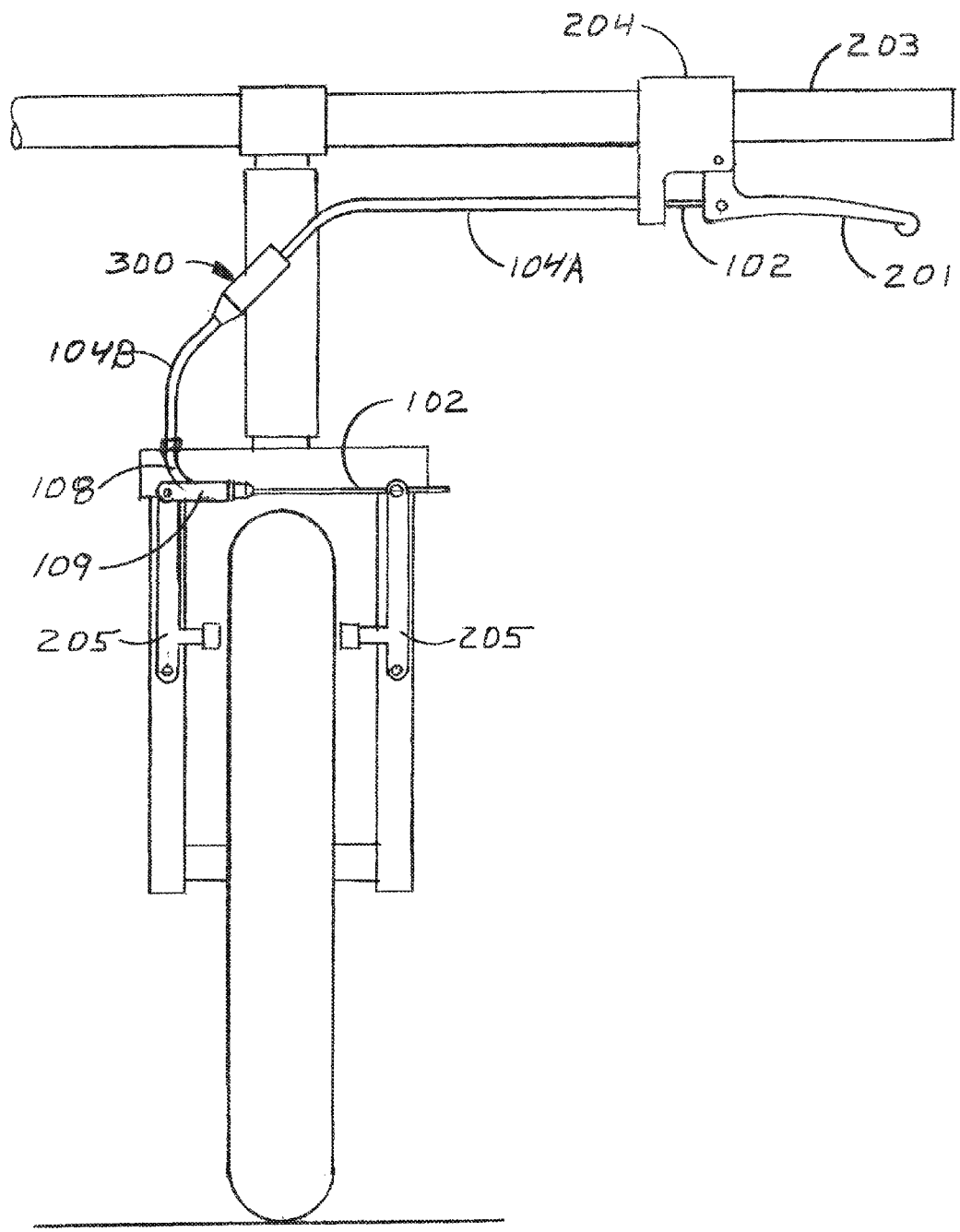
Figure 5C:
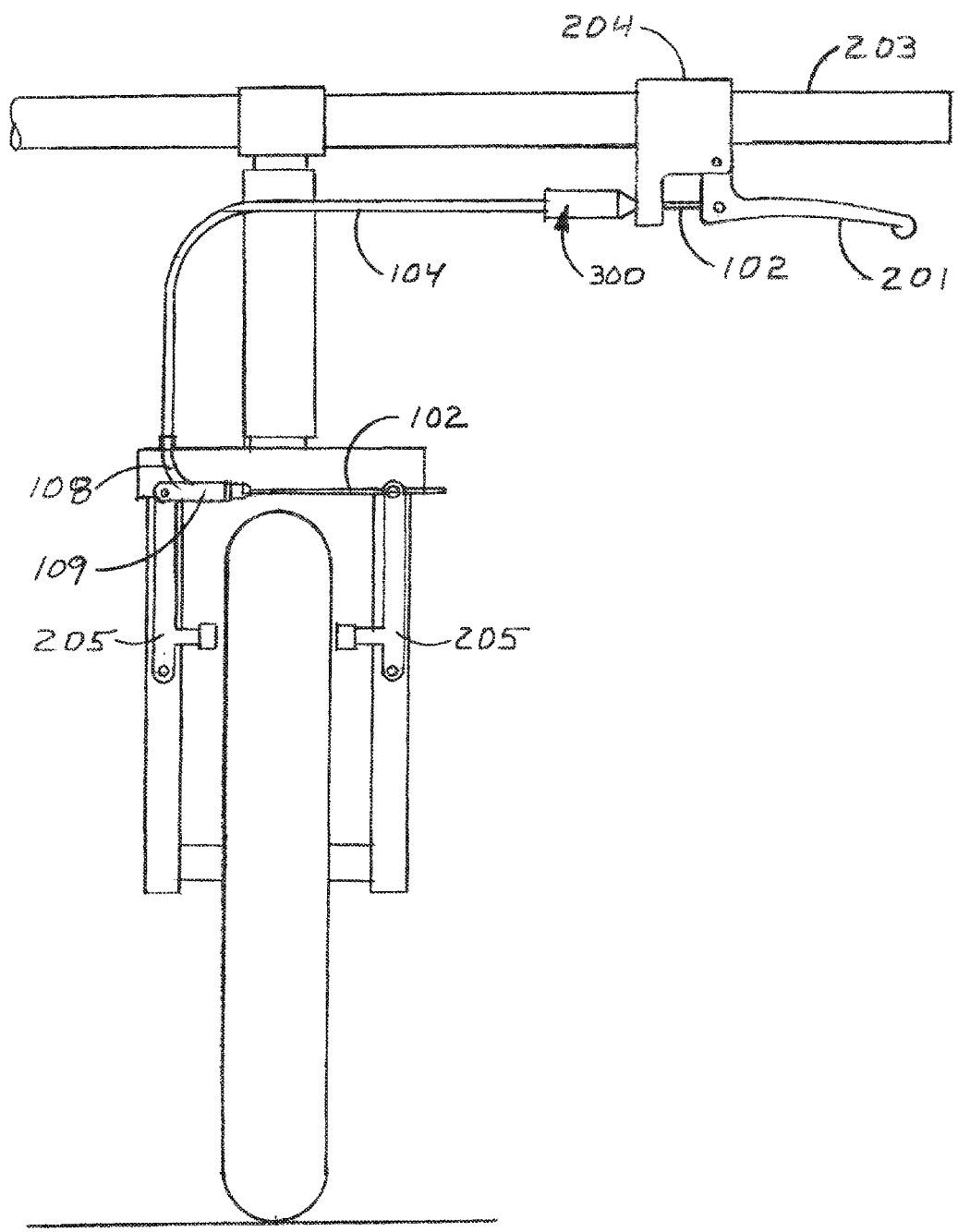

FIGS. 5A, 5B and 5C are perspective views of the possible locations of the brake safety device on the front brake system of a bicycle with cable actuated linear pull brakes. FIG. 5A is an illustration of one or more embodiments of the brake safety device 300 with location at the linear pull brake caliper 205. FIG. 5B is an illustration of one or more embodiments of the brake safety device 300 with location along the brake cable housing, e.g. 104, 104A, and 104B, route between the brake lever 201 and the linear pull brake caliper 205. FIG. 5C is an illustration of one or more embodiments of the brake safety device 300 with location at the brake lever housing 204 on the front brake system of a bicycle with cable actuated linear pull brakes 205.

Figure 6A:
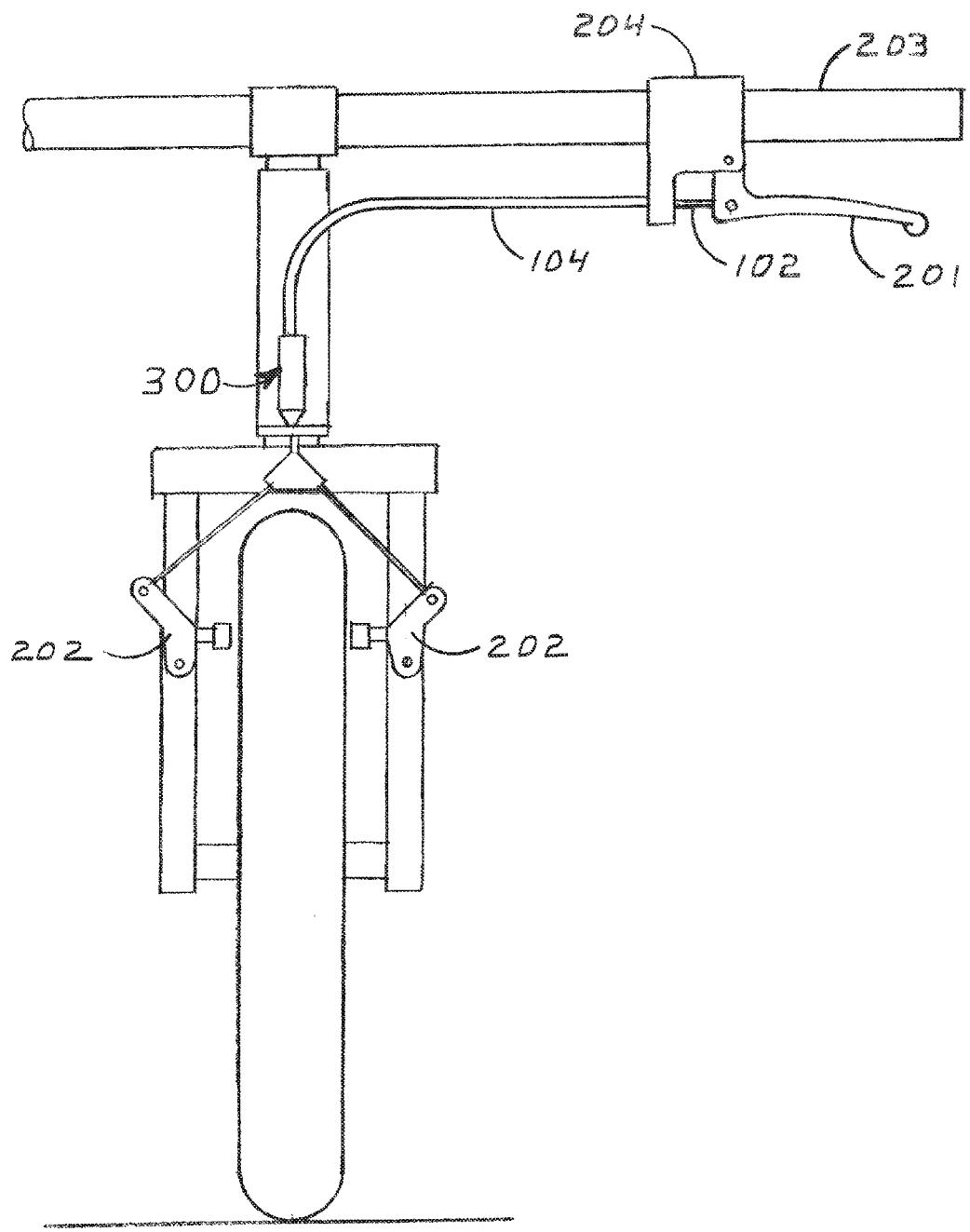
FIGS. 6A, 6B and 6C are perspective views of the possible locations of the brake safety device in the front brake system of a bicycle with cable actuated cantilever brakes in accordance with one or more embodiments of the present invention.
Figure 6B:
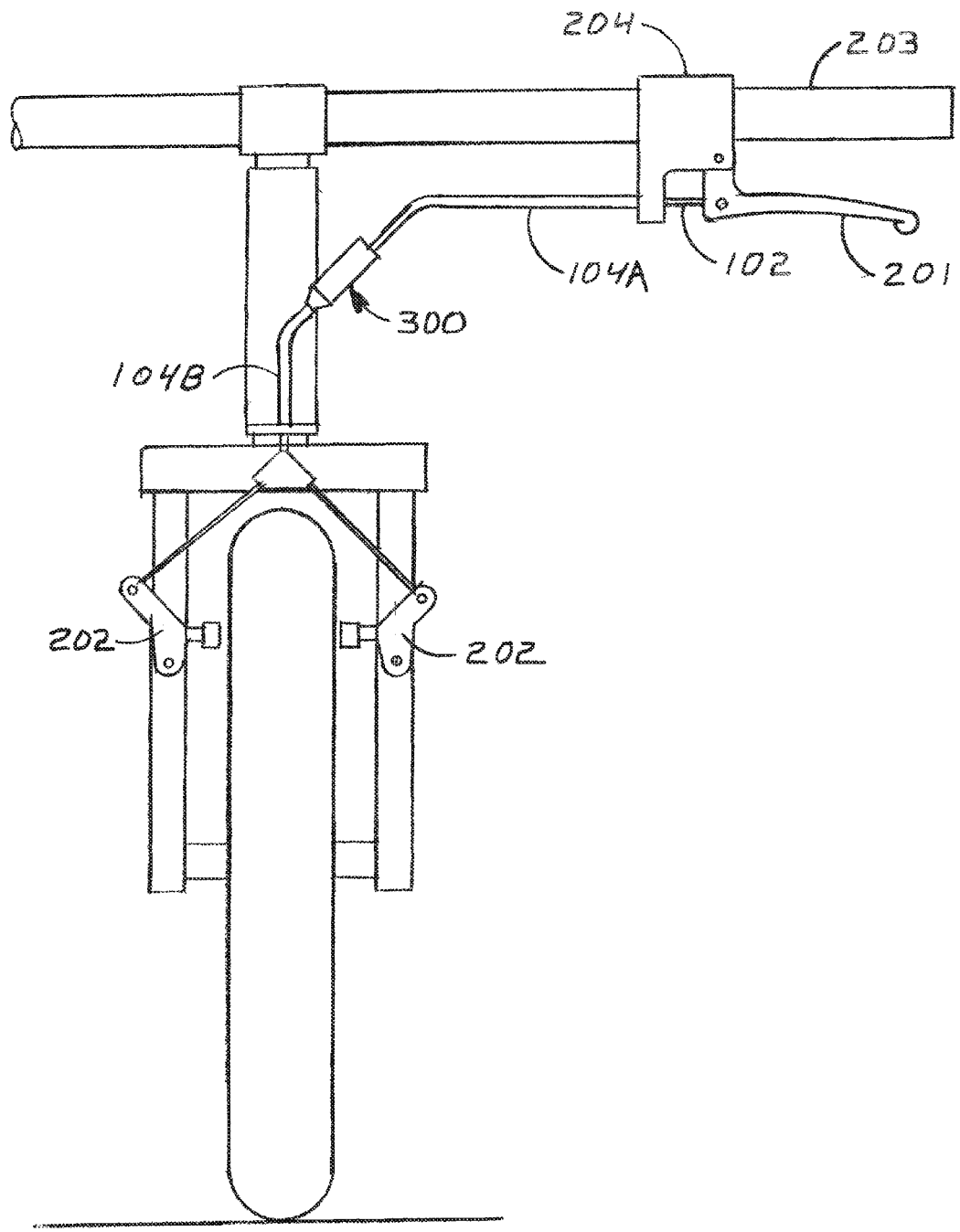
Figure 6C:
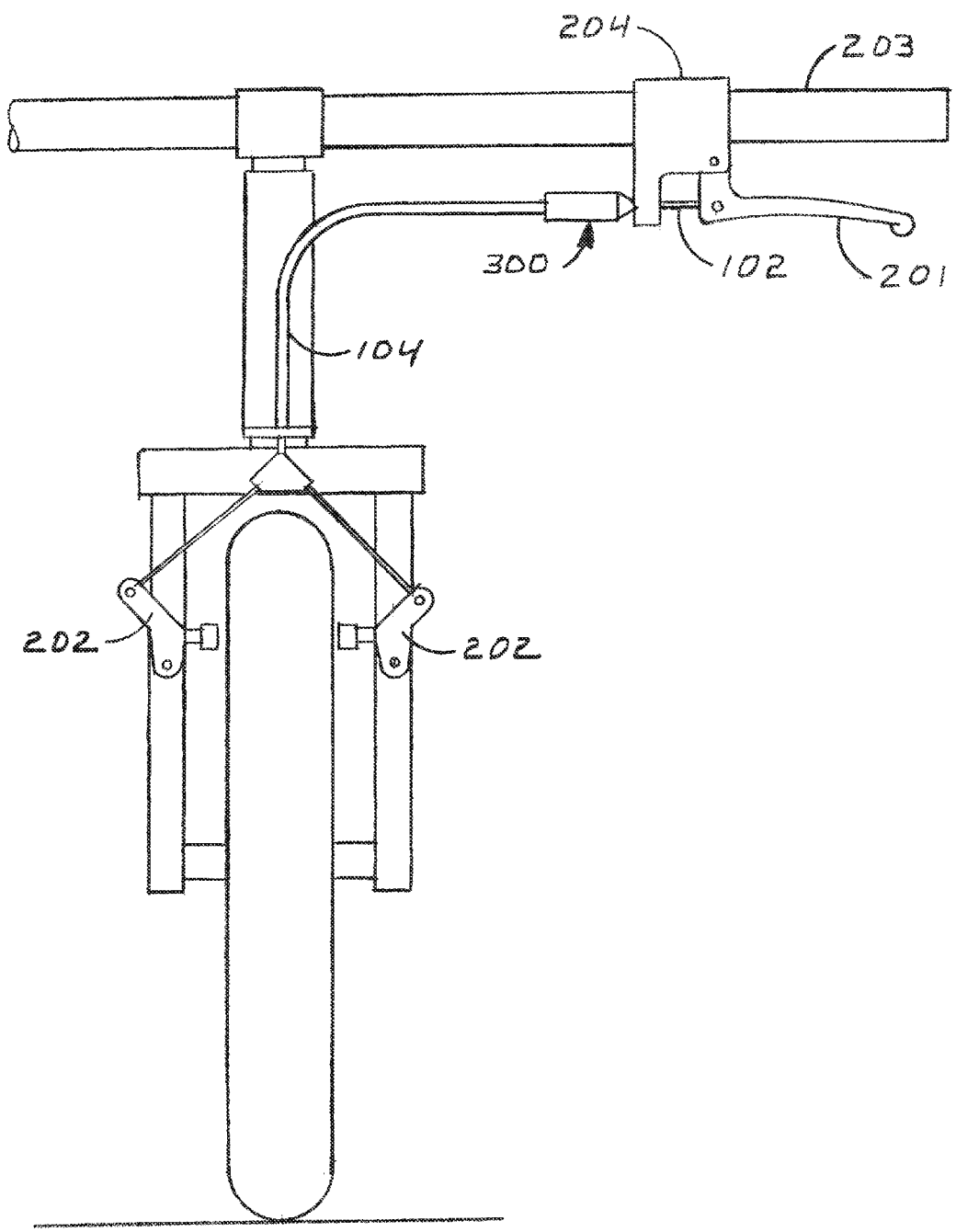

FIGS. 6A, 6B and 6C are perspective views of the possible locations of the brake safety device on the front brake system of a bicycle with cable actuated cantilever brakes. FIG. 6A is an illustration of one or more embodiments of the brake safety device 300 with location at the cantilever brake caliper 202.

FIG. 6B is an illustration of one or more embodiments of the brake safety device 300 with location along the brake cable housing, e.g. 104,104A, and 104B, route between the brake lever 201 and the cantilever brake caliper 202. FIG. 6C is an illustration of one or more embodiments of the brake safety device 300 with location at the brake lever housing 204 on the front brake system of a bicycle with cable actuated cantilever brakes 202.

Figure 7A:
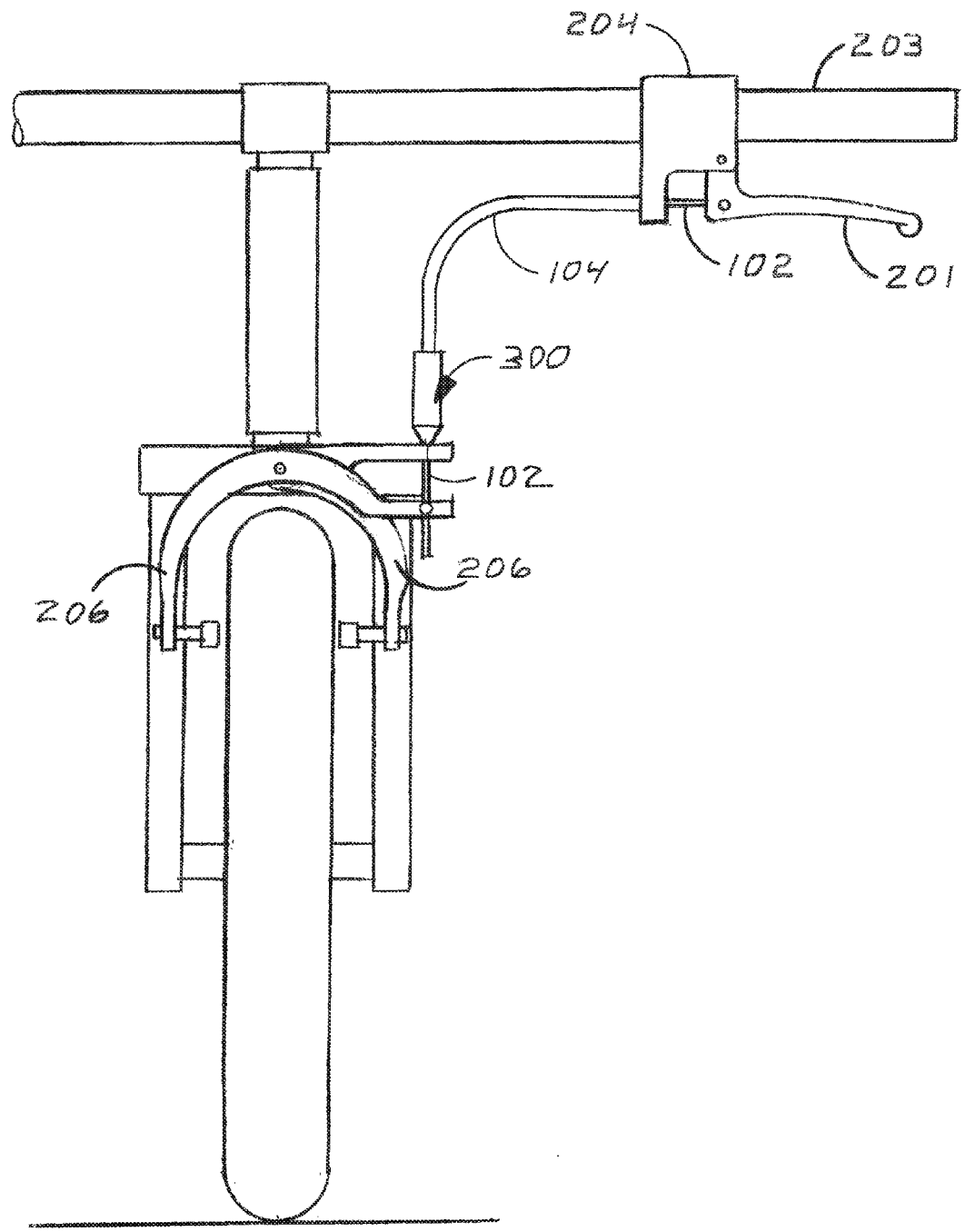
FIGS. 7A, 7B and 7C are perspective views of the possible locations of the brake safety device in the front brake system of a bicycle with cable actuated caliper brakes in accordance with one or more embodiments of the present invention.
Figure 7B:
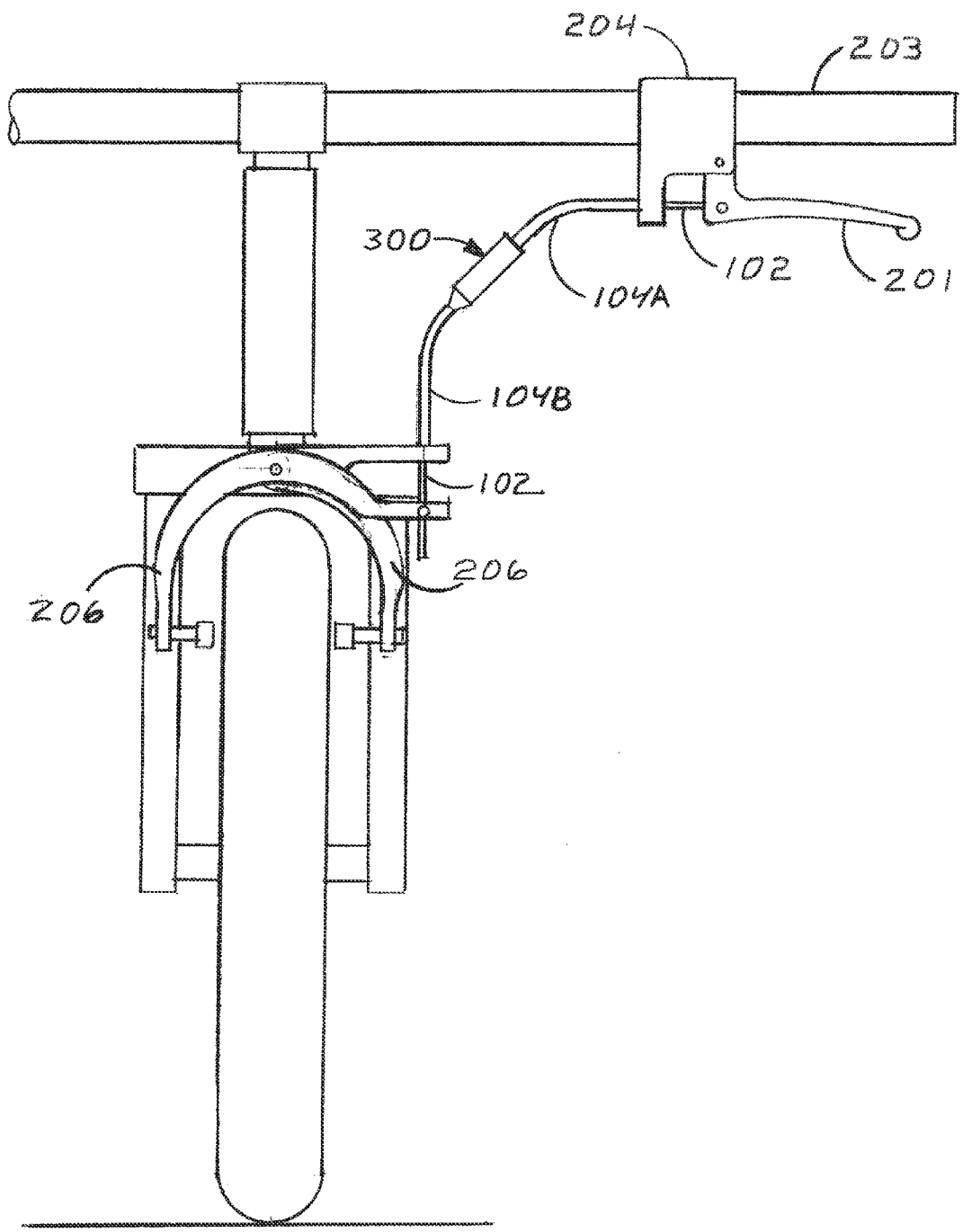
Figure 7C:
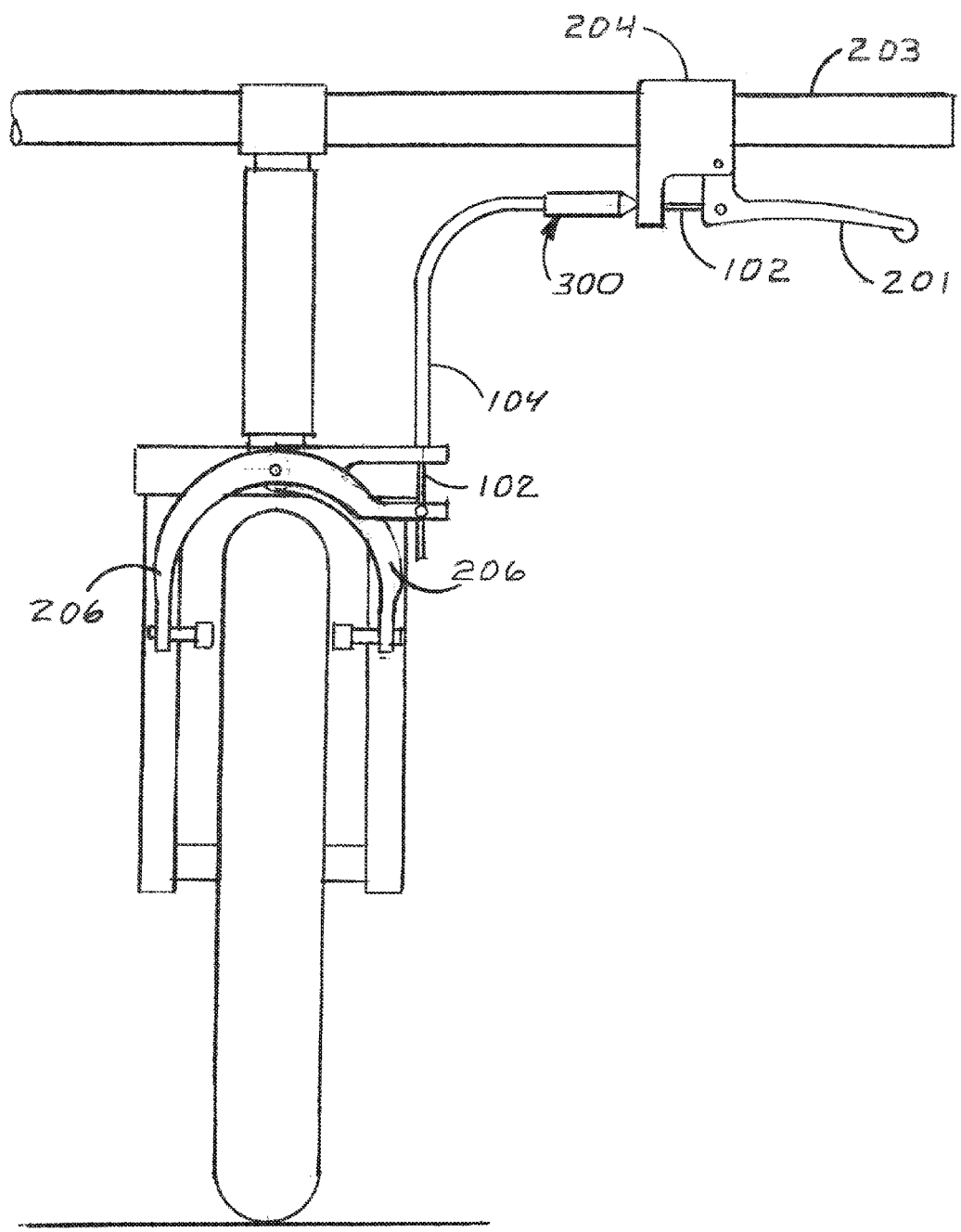

FIGS. 7A, 7B and 7C are perspective views of the possible locations of the brake safety device on the front brake system of a bicycle with cable actuated caliper brakes. FIG. 7A is an illustration of one or more embodiments of the brake safety device 300 with location at the brake caliper 206. FIG. 7B is an illustration of one or more embodiments of the brake safety device 300 with location along the brake cable housing 104 route between the brake lever 201 and the brake caliper 206. FIG. 7C is an illustration of one or more embodiments of the brake safety device 300 with location at the brake lever housing 204 on the front brake system of a bicycle with cable actuated caliper brakes 206.

Figure 8A:
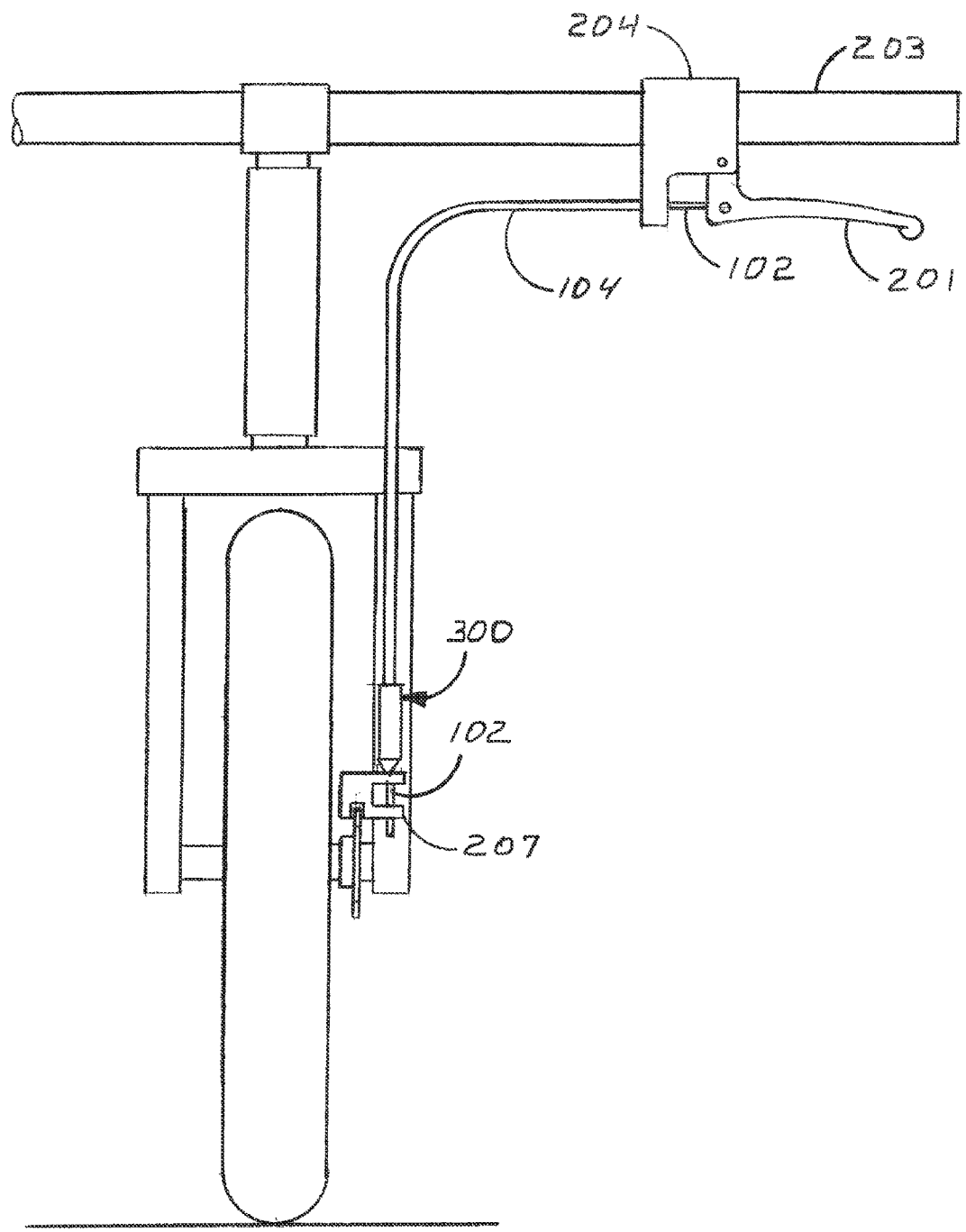
FIGS. 8A, 8B and 8C are perspective views of the possible locations of the brake safety device in the front brake system of a bicycle with cable actuated disc brakes in accordance with one or more embodiments of the present invention.
Figure 8B:
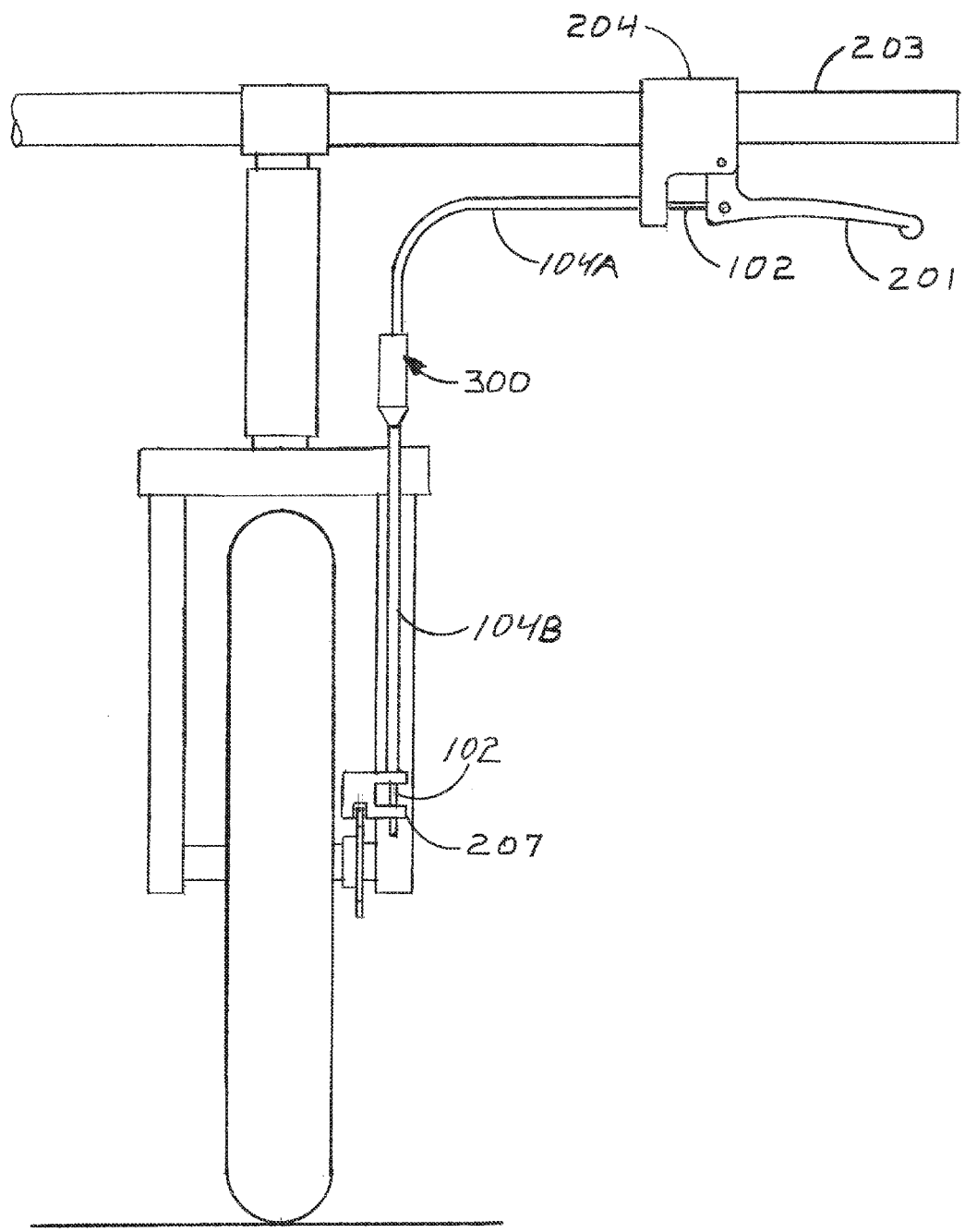
Figure 8C:
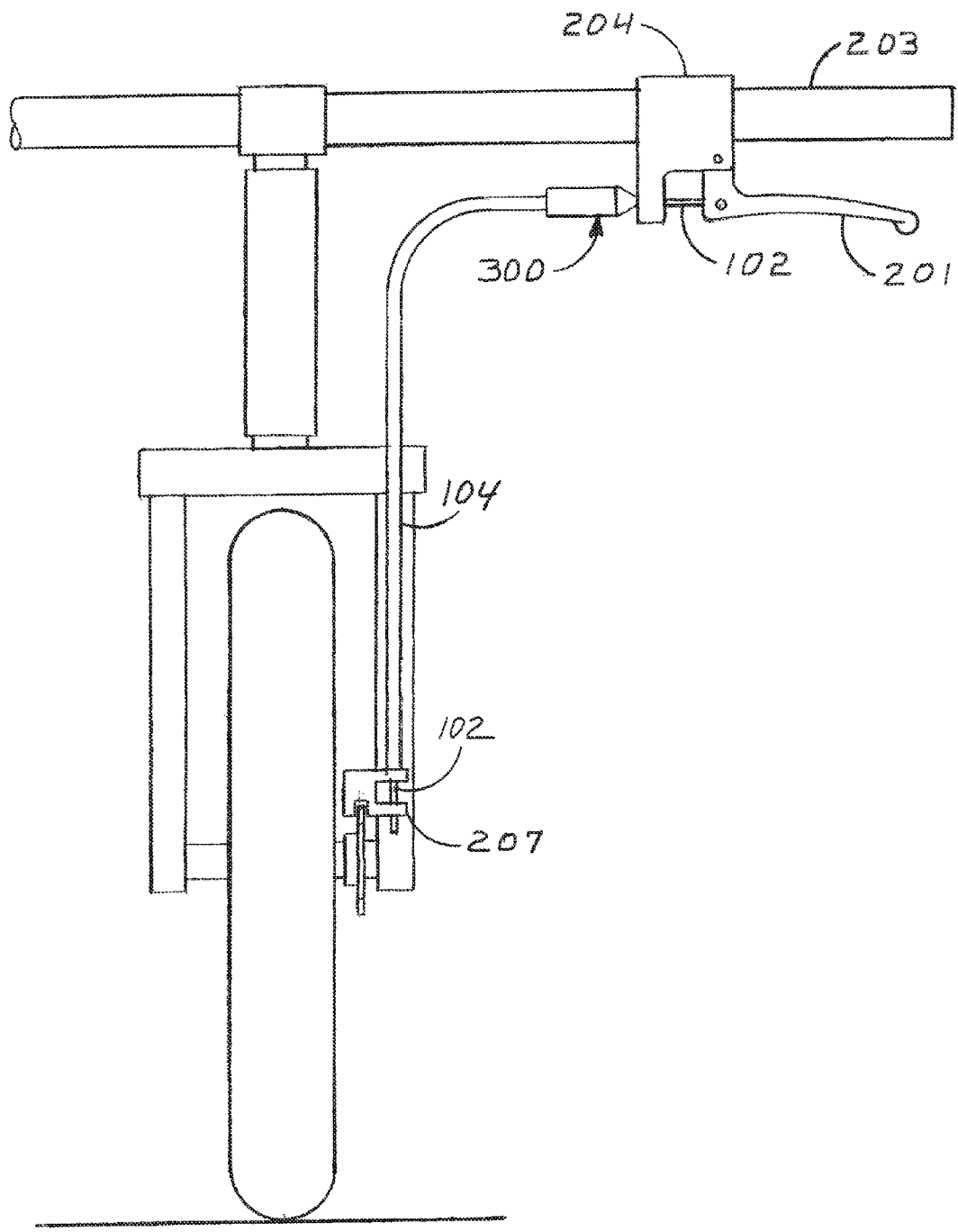

FIGS. 8A, 8B and 8C are perspective views of the possible locations of the brake safety device on the front brake system of a bicycle with cable actuated disc brakes. FIG. 8A is an illustration of one or more embodiments of the brake safety device 300 with location at the disc brake caliper 207. FIG. 8B is an illustration of one or more embodiments of the brake safety device 300 with location along the brake cable housing, e.g. 104, 104A, and 104B, route between the brake lever 201 and the disc brake caliper 207. FIG. 8C is an illustration of one or more embodiments of the brake safety device 300 with location at the brake lever housing 204 on the front brake system of a bicycle with cable actuated disc brakes 207.

In general, the front braking system of a bicycle comprises a brake lever 201 pivotally coupled to brake lever housing 204. In one or more embodiments, brake lever housing 204 is coupled to a handlebar 203 of a bicycle, for example. A brake cable 102 is coupled to brake lever 201 such that application of force to the brake lever 201 results in a pull force on the brake cable 102. The brake cable 102 is routed through a flexible brake cable housing, e.g. 104, 104A and 104B, which generally comprises a metal inner layer and an outer layer made of resin. For linear-pull brakes, brake cable 102 is further routed through brake noodle 108 and coupled to brake assembly 205. Brake noodle 108 is fixedly secured to connecting rod 109 of the brake assembly 205. Brake noodle 108 is a guiding tube for the brake cable 102 to the linear pull brake cable assembly 205. Brake noodle 108 is preferably made of metal, e.g. stainless steel, with a resin inner liner. Brake cable 102 is preferably made of intertwined thin steel wires.

As illustrated in FIGS. 5A through 8C, embodiments of the brake safety device of the present invention may be placed on different locations between the brake caliper assembly, e.g. 202, 205, 206 or 207, and the brake lever housing 204.

Figure 9A:
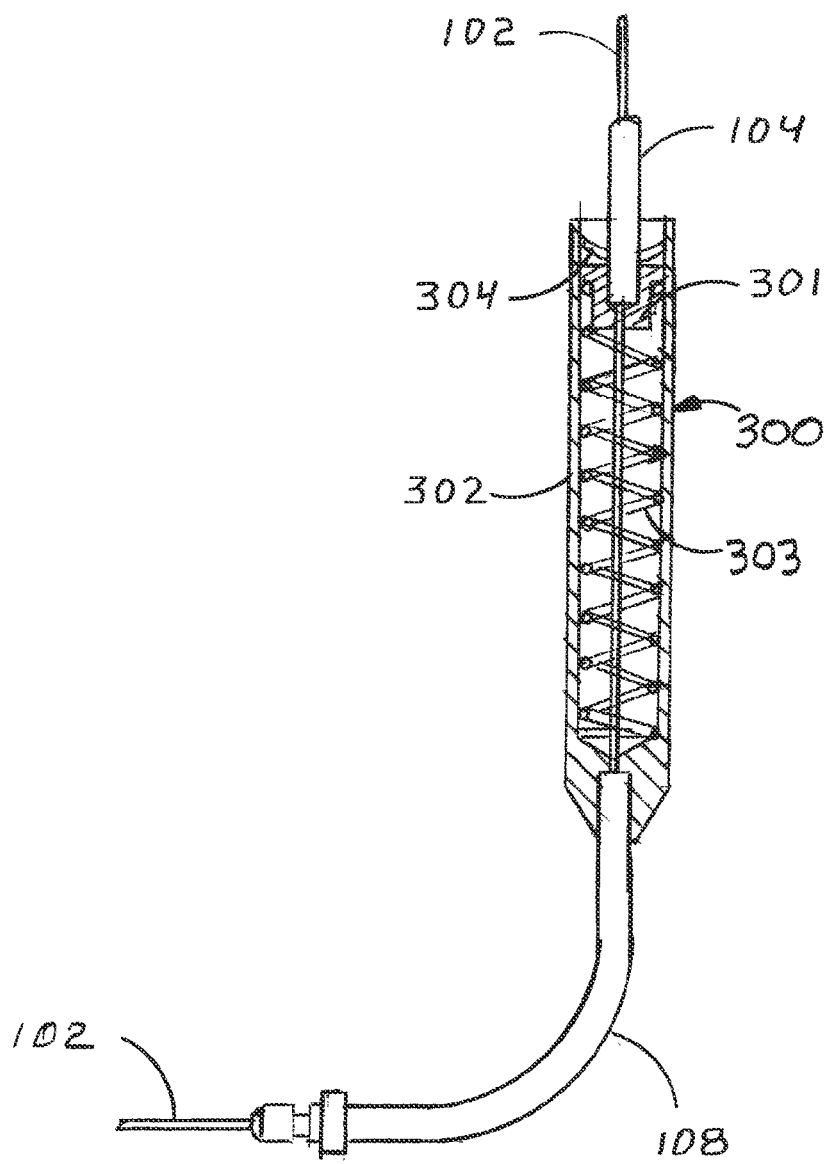
FIG. 9A is a cutaway view of the brake safety device using a compression spring in accordance with one or more embodiments of the present invention.

FIG. 9A is a cut-away view of a brake safety device 300 in accordance with the one or more embodiments of the present invention. As illustrated, brake safety device 300 comprises a housing 302; a compression spring 303; a piston 301; and a locking star washer 304. Compression spring 303 and piston 301 are contained inside a lumen of housing 302. Compression spring 303 includes a preload against piston 301 that is equivalent to a preset breakout force. Piston 301 and compression spring 303 are secured in housing 302 by locking star washer 304.

FIGS. 9B through 9E are exploded front elevational views of the brake safety device 300 with different types of piston retainers in accordance with various embodiments of the present invention. As illustrated in FIGS. 9B-E, housing 302 comprises a lumen running from its proximal end to its distal end. The lumen of housing 302 comprises a first section 309 at the proximal end with a diameter slightly larger than the outer diameter of noodle 108. The lumen of housing 302 further comprises a second section 310, abutting the first section, with a diameter slightly greater than an outer diameter of brake cable 102 thus sufficient for free movement of brake cable 102 but less than the diameter of the first section. The lumen of housing further comprises a third section 311 abutting the second section and running to approximately the distal end of housing 302. The diameter of the third section is larger than the first and second sections and is sufficient to retain and allow linear movement of compression spring 303. The length of section 311 of the lumen is preferably sufficient to fully compress compression spring 303 while retaining a full stroke of the brake lever 201.

Piston 301 is configured to compress compression spring 303 and fit inside third section 311 of the lumen of housing 302. Thus, piston has an overall outer diameter slight smaller than the inner diameter of the third section 311. Piston 301 may further be configured with a second section at its proximal end with an outside diameter sufficient to fit in the inside diameter of compression spring 303.

As illustrated, piston 301 comprises a lumen with sections 312 and 313 running from its proximal end to its distal end. Section 312 at the proximal end of piston 301 has a diameter slightly greater than an outer diameter of brake cable 102 but less than the diameter of section 313, thus sufficient to allow free linear movement of brake cable 102. Section 313, abutting the section 312, has a diameter slightly larger than the outer diameter of brake cable housing 104 and greater than the diameter of section 312. Brake cable housing 104 snugly fits into section 313 to secure the piston, i.e. 301, onto the brake cable housing, i.e. 104.

FIGS. 9B through 9E illustrates the several different methods of retaining piston 301 in housing 302.

Figure 9B:
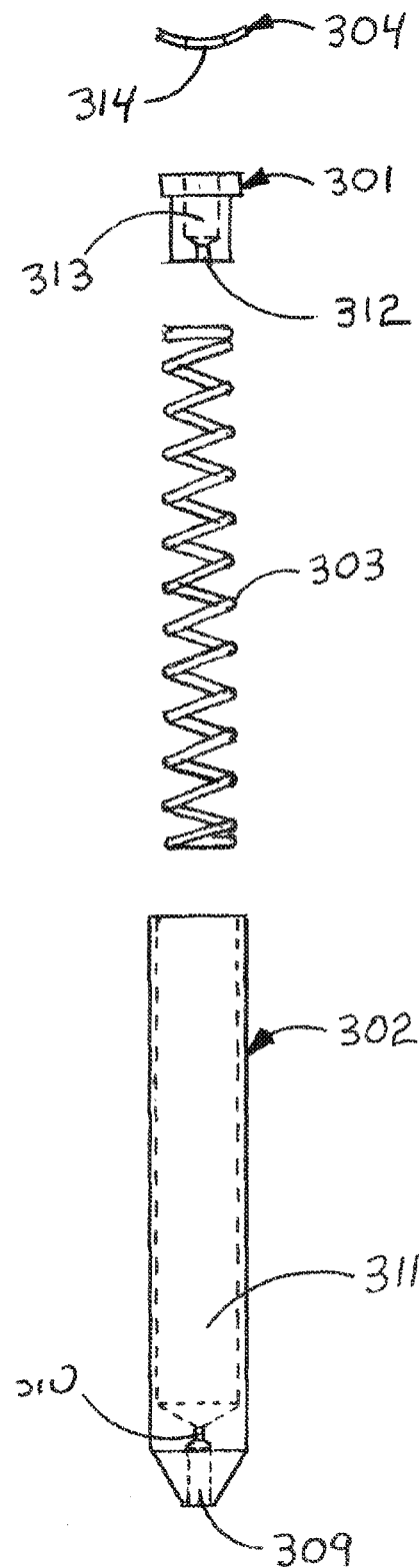
FIGS. 9B, 9C, 9D, and 9E are exploded front elevational views of the brake safety device with different types of piston retainers in accordance with one or more embodiments of the present invention.

Referring to FIG. 9B, the brake safety device includes a locking star washer 304 with an orifice 314 having a diameter slightly larger than the outer diameter of brake housing 104. In the illustrated embodiment, brake housing 104 fits through orifice 314 and then couples to piston 301.

Figure 9C:
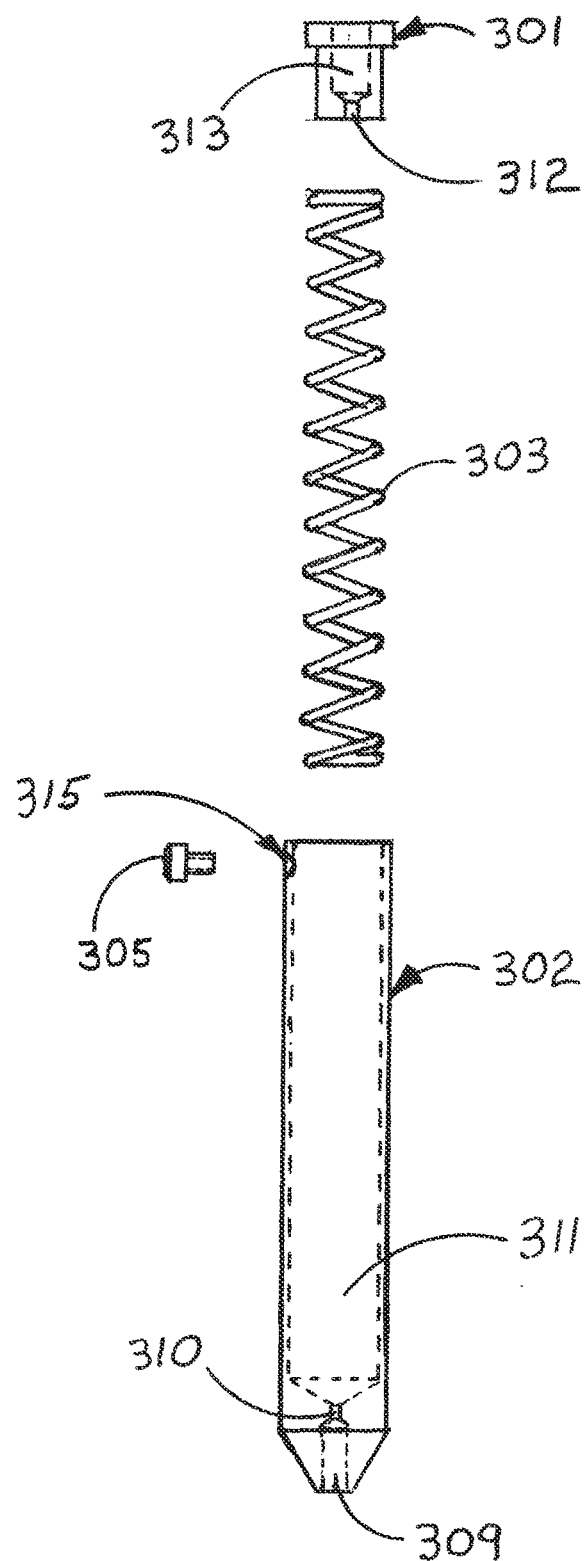

Referring to FIG. 9C, the brake safety device includes a locking fastener 305 and a orifice 315 at the distal end of housing 302 to retain piston 301. In one or more embodiments, fastener 305 is secured into orifice 315 to provide a stop for piston 301. Fastener 305 may be a pin, set bolt, set screw, or any other type of fastener that can retain piston 301 inside housing 302. Orifice 315 may be threaded in embodiments when locking fastener 305 is a screw or bolt, for instance. Those of skill in the arts would appreciate that the type of fastener, i.e. 305, would determine the configuration of orifice 315.

Figure 9D:
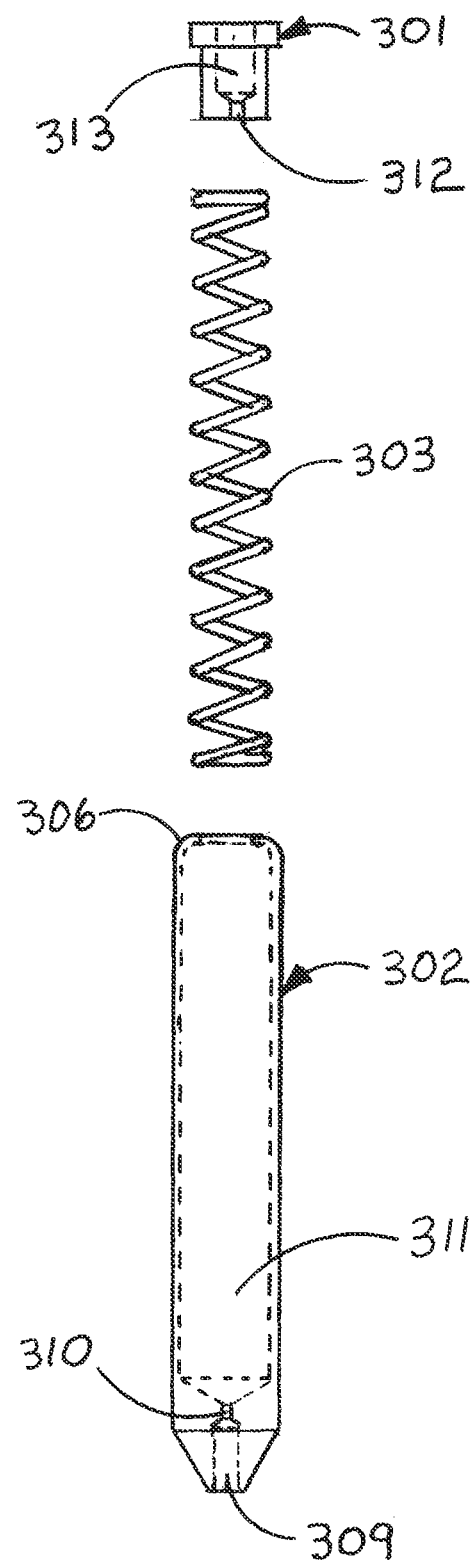

Referring to FIG. 9D, the distal end 306 of housing 302 is tapered to a diameter less than the outside diameter of piston 301 thereby providing a stop for piston 301. In this configuration, an additional locking washer may not be necessary.

Figure 9E:
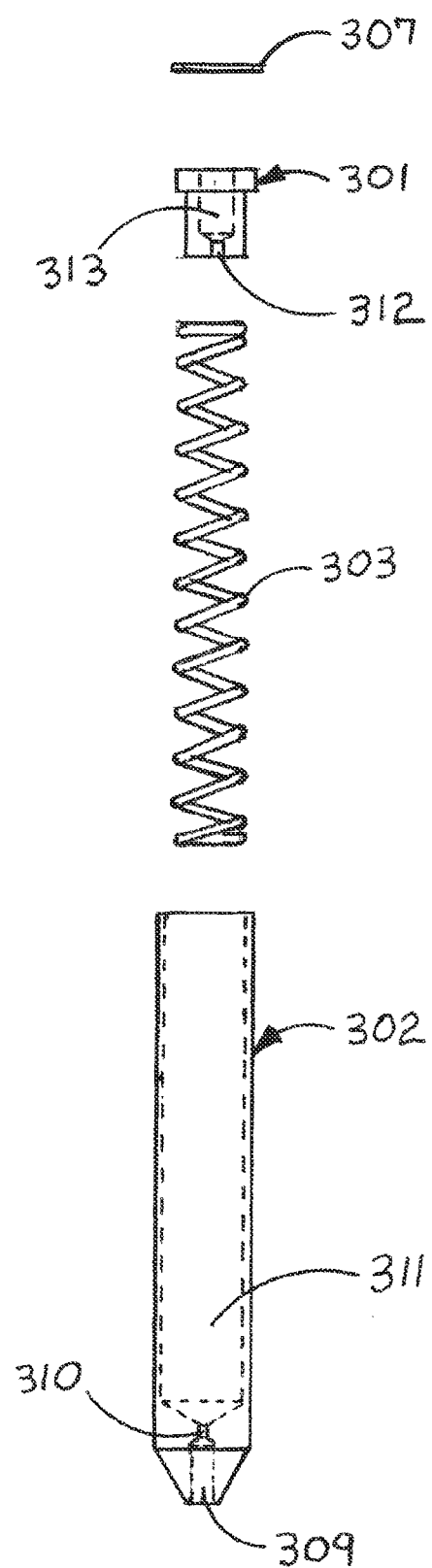

Referring to FIG. 9E, an internal retaining ring 307 is inserted in the wall tubing of housing 302 to retain piston 301. The retaining ring may fit snugly into a groove (not shown) at the distal end of lumen 311 in housing 302 to secure the piston inside the housing.

Referring back to FIG. 9A, brake housing 104 is coupled through locking star washer 304 to piston 301 at section 313, and brake noodle 108 is coupled to housing 302 at section 309 resulting in routing of brake cable 102 through the center of the brake safety device 300. This center routing eliminates any additional side loads or friction on the brake cable 102 from the brake safety device 300 during normal operation. Thus, the front brake feels the same to the rider during normal operation when the brake safety device is installed on the bicycle.

In operation, when a force from brake lever 201 exceeds the preset level, i.e. breakout force, compression spring 303 compresses and piston 301 moves the brake cable housing 104 in a direction towards the proximal end of housing 302. The cable housing 104 moves since the brake noodle 108 is fixedly attached to the brake cable assembly 205 and thus may not move. This movement of the brake cable housing 104 towards the proximal end of housing 302 effectively extends the length of brake cable 102 allowing brake lever 201 to move all the way to handlebar 203 while reducing the power of the front brake. It is preferable that housing 302 and compression spring 303 are of sufficient length to allow brake lever 201 to move all the way to handlebar 203 and not fatigue compression spring 303.

The preload of compression spring 303 determines the force from brake lever 201 that will move piston 301 and brake cable housing 104. The preload force may vary for the different types of cable actuated bicycle brakes including linear pull brakes 205, caliper brakes 206, cantilever brakes 202 and disc brakes 207. The preload for compression spring 303 may be determined by testing the different types of brakes with a brake safety device 300 on a bicycle and finding the highest preload that will not allow the rear wheel to come off the ground when the front brake is applied aggressively and the brake lever 201 is pulled all the way to handlebar 203. For instance, a preload determined for a 100 lbs. person may be sufficient for most adults with weight greater than 100 lbs. Thus, it is not necessary to make the preload adjustable for every biker.

The spring rate of compression spring 303 determines how much braking power will be available after the brake safety device is activated. A desirable spring rate should provide about 95% of the maximum safe braking power after activation of the brake safety device. The maximum safe braking power of the front brake is determined by measuring the shortest stopping distance of the bicycle without lifting the rear wheel off the ground when there is no brake safety device installed.

Compression spring 303 automatically pushes piston 301 and brake cable housing 104 back to the start position when brake lever 201 is released and the front brake returns to operating normally.

Configuration of lumen 309 depends on the type of braking system. For instance, when the brake safety device 300 is attached to a linear pull brake caliper 205, lumen section 309 of housing 302 is sized to accept noodle 108 (see FIGS. 5A, 9A). When the brake safety device is attached to a caliper brake 206, a cantilever brake 202 or a disc brake 207, lumen section 309 of housing 302 is sized to accept brake cable housing, e.g. 104 and 104B (see FIGS. 5B, 6B, 7B, and 8B). When the brake safety device 300 is attached to brake lever housing 204, lumen section 309 of housing 302 may be sized to accept a brake cable housing 104 (see FIGS. 5A, 9A). When the brake safety device 300 is attached anywhere along the brake cable 104 route, housing 302 is sized to accept brake cable housing 104, i.e. between 104A and 104B (see FIGS. 5B, 6B, 7B, and 8B).

Figure 10:
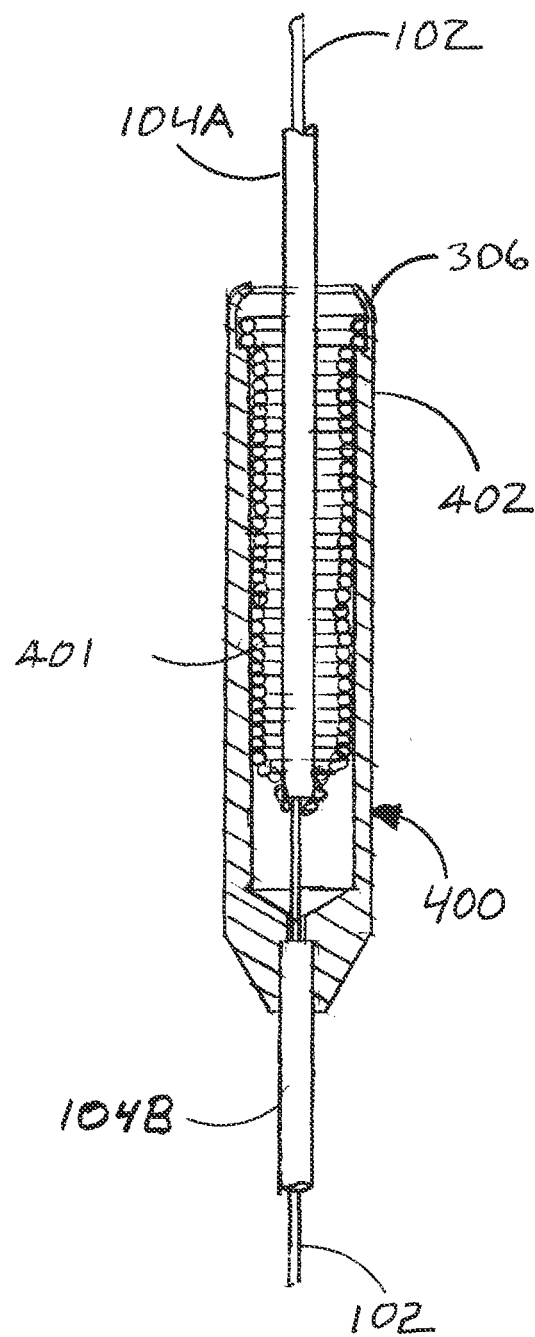
FIG. 10 is a cutaway view of brake safety device using an extension spring in accordance with one or more embodiments of the present invention.

FIG. 10 is a cutaway view of the brake safety device 300 using extension spring 401. In this configuration, brake cable housing 104 is secured in the conical end (i.e. proximal end) of extension spring 401. The other end (i.e. distal end) of extension spring 401 is secured by the step in the wall tubing of housing 402.

When the force from brake lever 201 exceeds the preset level, extension spring 401 extends inside housing 402 allowing the brake cable housing 104 to move. This extends the length of brake cable 102 allowing brake lever 201 to move all the way to handlebar 203 reducing the power of the front brake. It is preferable that housing 402 and extension spring 401 are of sufficient length to allow brake lever 201 to move all the way to handlebar 203 and not fatigue extension spring 401.

The preload of extension spring 401 determines the force from brake lever 201 that will move cable housing 104. The preload of extension spring 401 is done when manufacturing the spring. The preload force may vary for the different types of cable actuated bicycle brakes including linear pull brakes 205, caliper brakes 206, cantilever brakes 202 and disc brakes 207. The preload for extension spring 401 may be determined by testing the different types of brakes with a brake safety device 300 on a bicycle and finding the highest preload that will not allow the rear wheel to come off the ground when the front brake is applied aggressively and the brake lever 201 is pulled all the way to handlebar 203.

The spring rate of extension spring 401 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Extension spring 401 automatically pulls brake cable housing 104 back to the start position when brake lever 201 is released and the front brake returns to operating normally.

Extension spring 401 can be retained in housing 402 with a pin or screw 305 inserted in the wall tubing of housing 402. Extension spring 401 can also be retained in housing 402 by bending the tubular walls of housing 402 inward 306. A locking star washer 304 or internal retaining ring 307 can also retain the extension spring 401 in housing 402.

Figure 11:
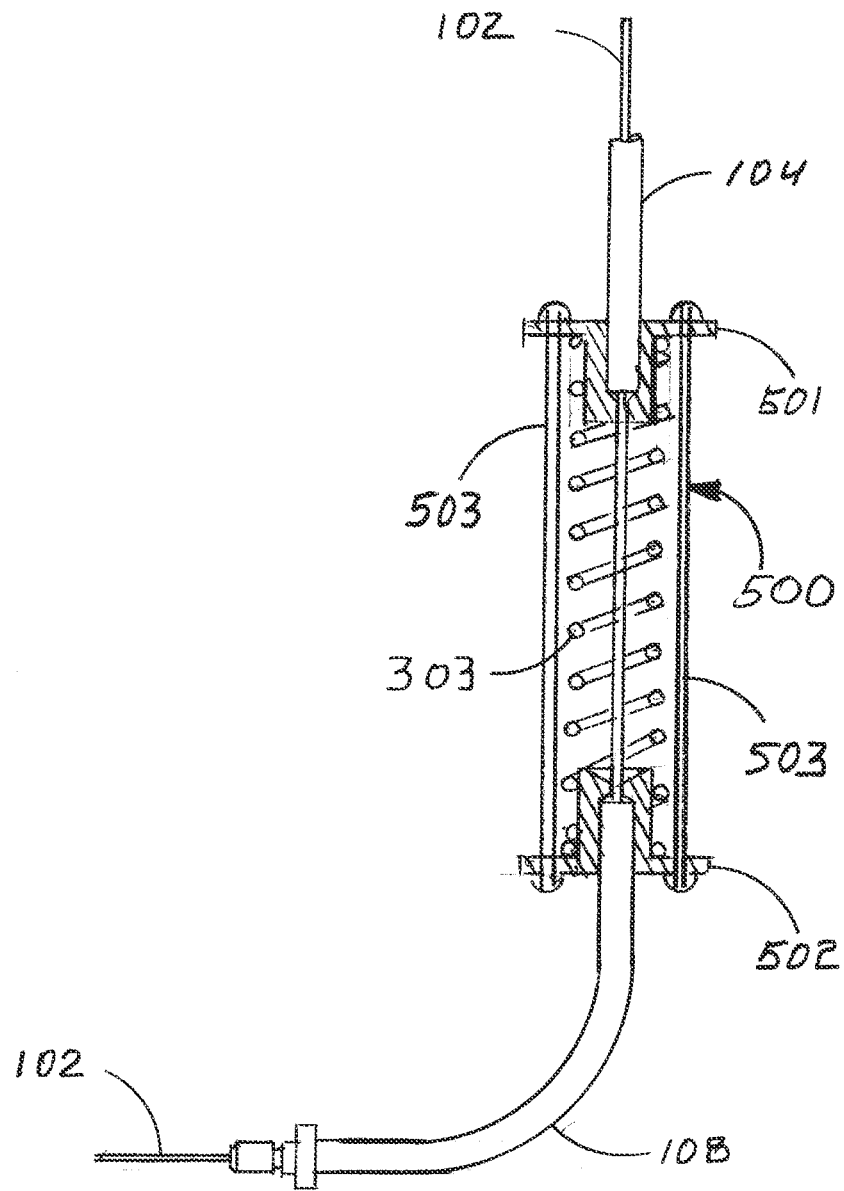
FIG. 11 is a view of the brake safety devices using a compression spring with no housing in accordance with one or more embodiments of the present invention.

One or more embodiments of the brake safety device can also be made without a housing. FIG. 11 is an illustration of the brake safety device 500 with no housing. As illustrated, brake cable housing 104 is secured to end cap 501 that is attached to the distal end of compression spring 303. The noodle 108 of a linear pull brake 205 is secured to end cap 502 that is attached to the proximal end of compression spring 303.

Compression spring 303 is preloaded by tie rods 503 that slip through end caps 501 and 502. The tie rods 503 are capped at each end. The preload of compression spring 303 determines the force from brake lever 201 that will move cable housing 104. The preload of compression spring 303 varies for the different types of cable actuated bicycle brakes including linear pull brakes 205, caliper brakes 206, cantilever brakes 202 and disc brakes 207. The preload for compression spring 303 may be determined by testing the different types of brake calipers with a brake safety device 300 on a bicycle and finding the highest preload that will not allow the rear wheel to come off the ground when the front brake is applied aggressively and the brake lever 201 is pulled all the way to handlebar 203.

When the force from brake lever 201 exceeds the preset level, spring 303 compresses allowing the brake cable housing 104 to move. This extends the length of brake cable 102 allowing brake lever 201 to move all the way to handlebar 203 reducing the power of the front brake. It is preferable that compression spring 303 is of sufficient length to allow brake lever 201 to move all the way to handlebar 203 and not fatigue compression spring 303.

The spring rate of compression spring 303 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Compression spring 303 automatically pushes brake cable housing 104 back to the start position when brake lever 201 is released and the front brake returns to operating normally.

Figure 12A:
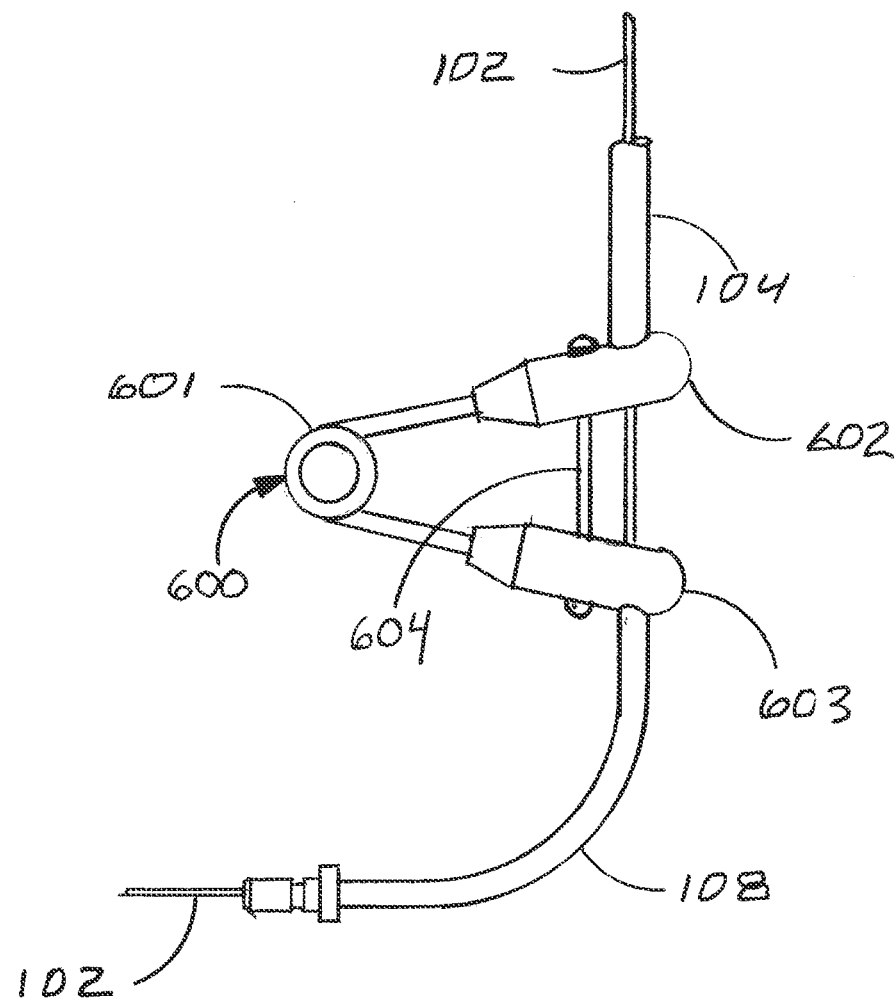
FIGS. 12A and 12B are views of brake safety devices using a torsion spring in accordance with one or more embodiments of the present invention.

Brake safety device 300 can also be made using a torsion spring. FIG. 12A shows brake safety device 300 using torsion spring 601. Brake cable housing 104 is secured end cap 602 that is attached to one end of torsion spring 601. Noodle 108 of linear pull brake 205 is secured to end cap 603 that is attached to the other end of torsion spring 601.

Torsion spring 601 is preloaded by tie rod 604 that slips through end caps 602 and 603. Tie rod 604 is capped at each end. The preload of torsion spring 601 determines the force from brake lever 201 that will move cable housing 104. The preload of torsion spring 601 varies for the different types of cable actuated bicycle brakes including linear pull brakes 205, caliper brakes 206, cantilever brakes 202 and disc brakes 207. The preload for torsion spring 601 is determined by testing the different types of brake calipers with a brake safety device 300 on a bicycle and finding the highest preload that will not allow the rear wheel to come off the ground when the front brake is applied aggressively and the brake lever 201 is pulled all the way to handlebar 203.

When the force from brake lever 201 exceeds the preset level, end caps 602 and 603 move towards each other allowing the brake cable housing 104 to move. This extends the length of brake cable 102 allowing brake lever 201 to move all the way to handlebar 203 reducing the power of the front brake. It is preferable that torsion spring 601 has of sufficient movement to allow brake lever 201 to move all the way to handlebar 203 and not fatigue torsion spring 601.

The spring rate of torsion spring 601 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Torsion spring 601 automatically pushes brake cable housing 104 back to the start position when brake lever 201 is released and the front brake returns to operating normally.

Figure 12B:
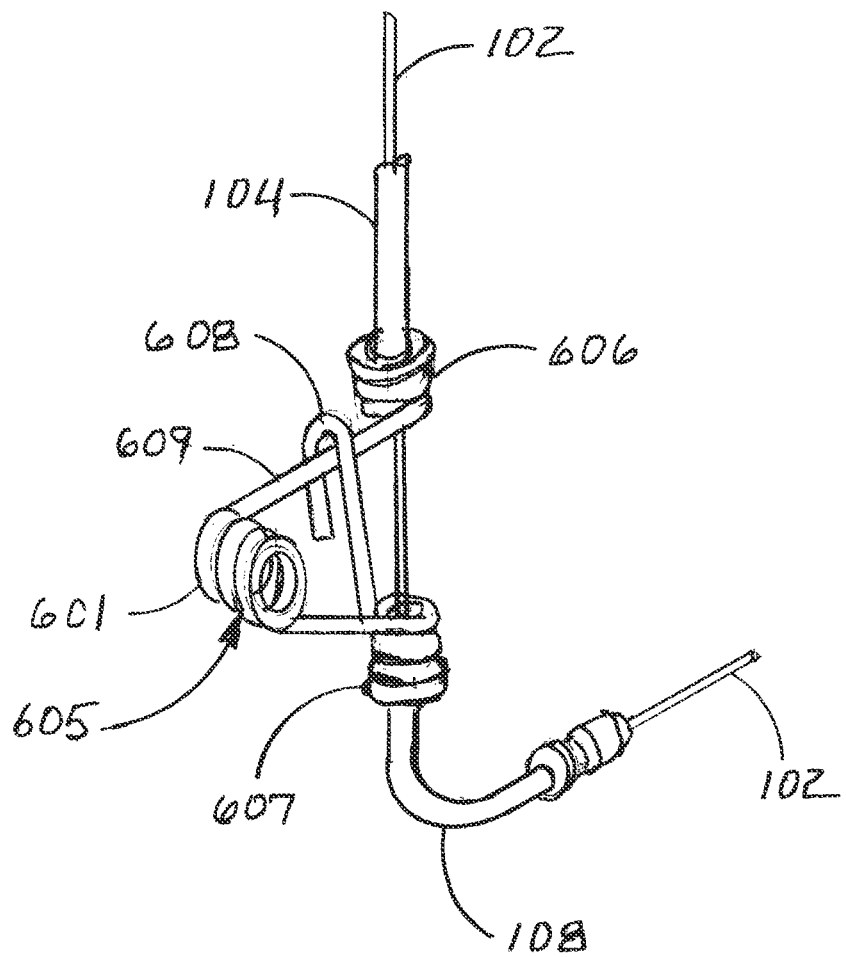

FIG. 12B shows the brake safety device 300 that is made with just one part, torsion spring 605. Brake cable housing 104 is secured to the conical end 606 of torsion spring 605. Noodle 108 of linear pull brake caliper 205 is secured to the other conical end 607 of torsion spring 605.

Torsion spring 605 is preloaded by the tie rod loop 608 that retains upper arm 609 of torsion spring 605. The preload of torsion spring 605 varies for the different types of cable actuated bicycle brakes including linear pull brakes 205, caliper brakes 206, cantilever brakes 202 and disc brakes 207. The preload for torsion spring 605 is determined by testing the different types of brake calipers with a brake safety device 300 on a bicycle and finding the highest preload that will not allow the rear wheel to come off the ground when the front brake is applied aggressively and the brake lever 201 is pulled all the way to handlebar 203.

When the force from brake lever 201 exceeds the preset level, the conical ends 606 and 607 move towards each other allowing the brake cable housing 104 to move. This extends the length of brake cable 102 allowing brake lever 201 to move all the way to handlebar 203 reducing the power of the front brake. It is preferable that torsion spring 605 has sufficient movement to allow brake lever 201 to move all the way to handlebar 203 and not fatigue torsion spring 605.

The spring rate of torsion spring 605 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Torsion spring 605 automatically pushes brake cable housing 104 back to the start position when brake lever 201 is released and the front brake returns to operating normally.

Figure 13:
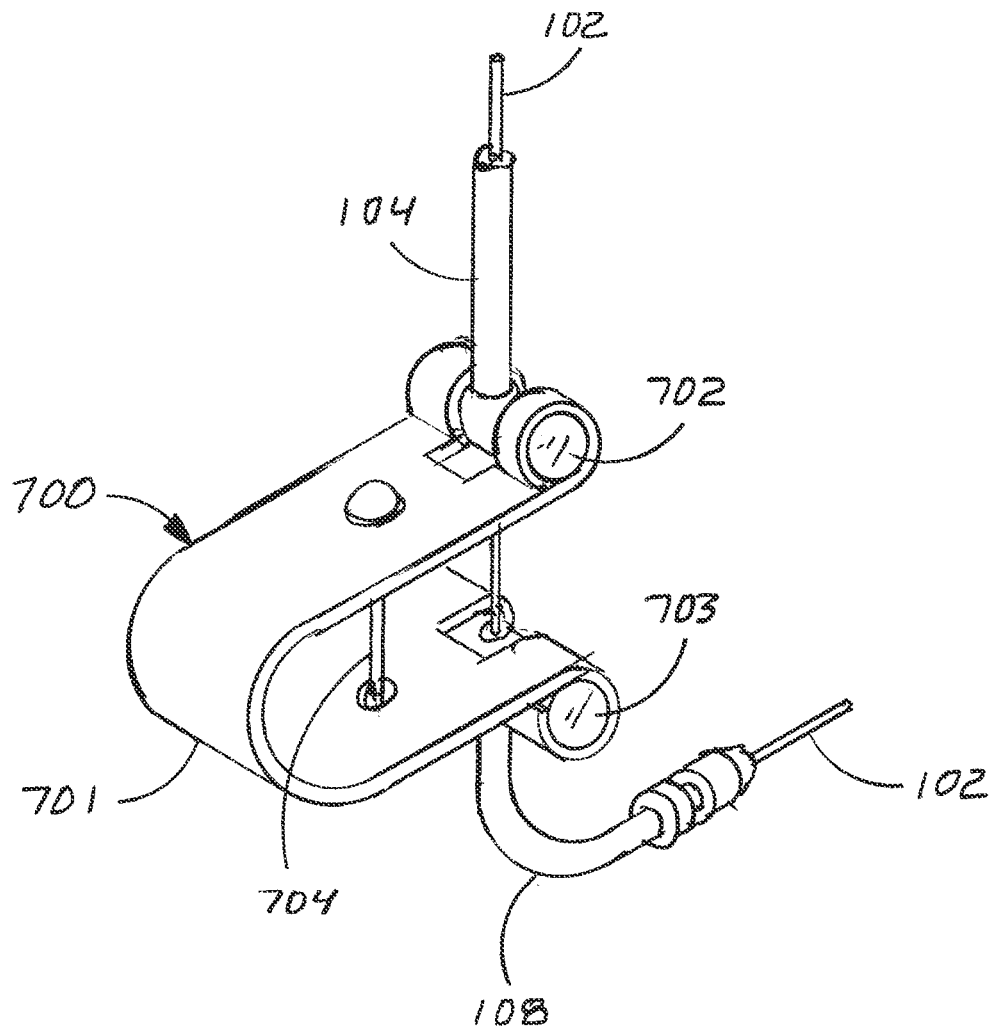
FIG. 13 is a view of the brake safety devices using a flat strap spring in accordance with one or more embodiments of the present invention.

FIG. 13 shows the brake safety device 300 using a flat strap spring 701. Brake cable housing 104 is secured to holder 702 that is attached to one end of flat strap spring 701. Noodle 108 of the linear pull brake 205 is secured to holder 703 that is attached to the other end of flat strap spring 701. Holders 702 and 703 pivot to align brake cable 102 as it passes through holders 702 and 703 to minimize friction when brake cable 102 moves.

Flat strap spring 701 is preloaded by tie rod 704 that slips through holes in both legs of flat strap spring 701. Tie rod 704 is capped on each end. The preload of flat strap spring 701 determines the force from brake lever 201 that will move cable housing 104. The preload of flat strap spring 701 varies for the different types of cable actuated bicycle brakes including linear pull brakes 205, caliper brakes 206, cantilever brakes 202 and disc brakes 207. The preload for flat strap spring 701 is determined by testing the different types of brake calipers with a brake safety device 300 on a bicycle and finding the highest preload that will not allow the rear wheel to come off the ground when the front brake is applied aggressively and the brake lever 201 is pulled all the way to handlebar 203.

When the force from brake lever 201 exceeds the preset level, holders 702 and 703 move towards each other allowing the brake cable housing 104 to move. This extends the length of brake cable 102 allowing brake lever 201 to move all the way to handlebar 203 reducing the power of the front brake. It is preferable that flat strap spring 701 has sufficient movement to allow brake lever 201 to move all the way to handlebar 203 and not fatigue flat strap spring 701.

The spring rate of flat strap spring 701 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Flat strap spring 701 automatically pushes brake cable housing 104 back to the start position when brake lever 201 is released and the front brake returns to operating normally.

Figure 14:
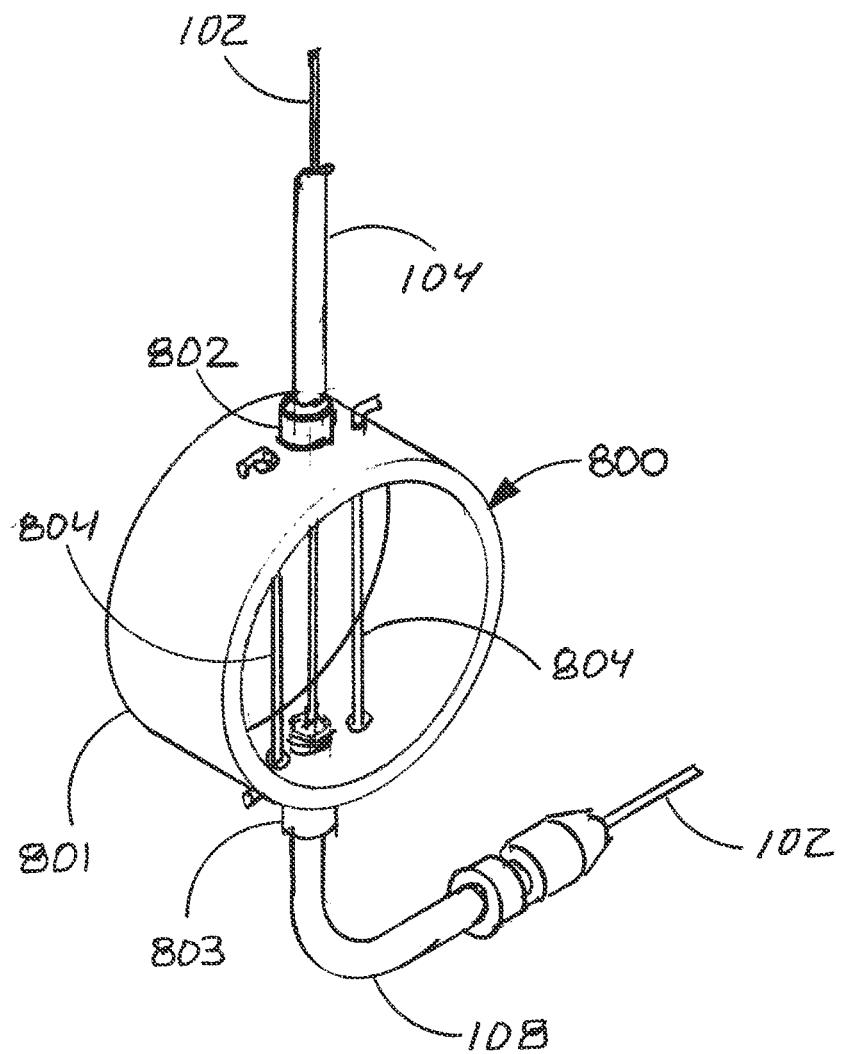
FIG. 14 is a view of a brake safety device using a circular strap spring in accordance with one or more embodiments of the present invention.

FIG. 14 shows the brake safety device 300 using a circular strap spring 801. Brake cable housing 104 is secured to holder 802 that is attached to the top of circular strap spring 801. Noodle 108 of linear pull brake 205 is secured to holder 803 that is attached to bottom of circular strap spring 801.

Circular strap spring 801 is preloaded by tie rods 804 that slip through holes on the top and bottom of circular strap spring 801. Tie rods 804 are capped on each end. The preload of circular strap spring 801 determines the force from brake lever 201 that will move brake cable housing 104. The preload of circular strap spring 801 varies for the different types of cable actuated bicycle brakes including linear pull brakes 205, caliper brakes 206, cantilever brakes 202 and disc brakes 207. The preload for circular strap spring 801 is determined by testing the different types of brakes with a brake safety device 300 on a bicycle and finding the highest preload that will not allow the rear wheel to come off the ground when the front brake is applied aggressively and the brake lever 201 is pulled all the way to handlebar 203.

When the force from brake lever 201 exceeds the preset level, holders 802 and 803 move towards each other allowing the brake cable housing 104 to move. This extends the length of brake cable 102 allowing brake lever 201 to move all the way to handlebar 203 reducing the power of the front brake. It is preferable that circular strap spring 801 has sufficient movement to allow brake lever 201 to move all the way to handlebar 203 and not fatigue circular strap spring 801.

The spring rate of circular strap spring 801 determines how much braking power will be available after the brake safety device is activated. Up to 95% of the maximum safe braking power can be available after activation of the brake safety device by increasing the spring rate. The maximum safe braking power of the front brake is determined by measuring the shortest stopping distance of the bicycle without lifting the rear wheel off the ground when there is no brake safety device installed.

Circular strap spring 801 automatically pushes brake cable housing 104 back to the start position when brake lever 201 is released and the front brake returns to operating normally.

The brake safety device 300 has no moving parts during normal braking thus giving it high reliability. There are no batteries to maintain and no adjustments to be made. The front brake operates normally until the preset force is exceeded by the rapid and aggressive application of the brake lever. When this occurs, the front brake is partially released and the rider is prevented from going over the handlebar. After the partial release, the front brake maintains up to 95% of its safe braking power. The front brake automatically resets itself when the brake lever is released.

The brake safety device is beneficial to any two wheel vehicles with cable actuated brakes that are prone to over the handlebar accidents. This includes electric bikes, electric scooters, and small motor bikes. The brake safety device can be used to limit the force being applied to any device using a cable in a flexible housing.

The brake safety device 300 works by extending the length of the brake cable 102 connected between the brake lever 201 and the brake caliper on bicycles with linear pull brakes 205, cantilever brakes 202, caliper brakes 206 and disc brakes 207. The method of extending the brake cable 102 is to move the brake cable housing 104. The brake cable 102 is routed through the center of the brake safety device 300 in such a way that there is no additional friction on the brake cable 102 during normal braking operation. The brake feels the same to the rider during normal braking operation when the brake safety device 300 is installed on the bicycle.

The brake safety device 300 can be located anywhere along the path of the brake cable 102. It can be connected to the brake lever housing 204 or to the brake caliper of a linear pull brake 205, a cantilever brake 202, a caliper brake 206 or a disc brake 207. The brake safety device 300 can also be located anywhere along the brake cable housing 104 route. There is no cutting of the brake cable 102 to install the brake safety device 300. It is easy to confirm that the brake safety device 300 is operational by simply squeezing the brake lever 201 aggressively to see that the brake lever 201 moves all the way to the handlebar 203. The brake safety device 300 is a simple design and is cost effective.

While the invention herein disclosed has been described by means of specific embodiments and applications thereof, numerous modifications and variations could be made thereto by those skilled in the art without departing from the scope of the invention set forth in the claims.

What is claimed is:

1. A brake safety apparatus comprising:
    a piston couplable to a first cable housing of a brake cable, wherein said brake cable is coupled at a first end to a brake lever and at a second end to a brake caliper system;
    a compression spring with a predetermined spring rate and a preload;
    a housing with a lumen running from its proximal end to its distal end, wherein said lumen comprises a first section at the proximal end with a diameter slightly larger than the outer diameter of a second cable housing of said brake cable to provide secure coupling of said second cable housing to said housing, said lumen further comprising a second section abutting the first section and having a diameter slightly greater than an outer diameter of the brake cable to permit free movement of the brake cable but less than the diameter of the first section, the lumen further comprising a third section abutting the second section and running to approximately the distal end of the housing, wherein the compression spring and the piston are located in the third section, wherein said third section of the lumen is of sufficient length to fully compress the compression spring while retaining a full stroke of the brake lever; and
    a fastener securing the piston and compression spring within the housing.

2. The brake safety apparatus of claim 1, wherein the fastener is a locking star washer.

3. The brake safety apparatus of claim 1, wherein the fastener is a retaining ring.

4. The brake safety apparatus of claim 1, wherein the fastener is a screw.

5. The brake safety apparatus of claim 1, wherein the preload is set for a subject of about 100 lbs weight.

6. The brake safety apparatus of claim 1, wherein the spring rate is selected to retain about 95% of the maximum safe braking power.

7. The brake safety apparatus of claim 1, wherein the second cable housing is a brake caliper noodle of a linear pull brake system.

8. A brake safety apparatus comprising:
    a piston couplable to a first cable housing of a brake cable, wherein said brake cable is coupled at a first end to a brake lever and at a second end to a brake caliper system;
    a spring with a predetermined spring rate and a preload;
    a housing with a lumen running from its proximal end to its distal end, wherein said lumen comprises a first section at the proximal end with a diameter slightly larger than the outer diameter of a second cable housing of said brake cable to provide snug coupling of said second cable housing to said housing to provide a center routing of said brake cable through said housing, said lumen further comprising a second section abutting the first section and having a diameter slightly greater than an outer diameter of the brake cable to permit free movement of the brake cable but less than the diameter of the first section, the lumen further comprising a third section abutting the second section and running to approximately the distal end of the housing, wherein the spring and the piston are located in the third section with the piston abutting the distal end of the spring, wherein said third section of the lumen is of sufficient length to allow full compression of the spring while retaining a full stroke of the brake lever; and a fastener securing the piston and spring within the housing.

9. The brake safety apparatus of claim 8, wherein the fastener is a locking star washer.

10. The brake safety apparatus of claim 8, wherein the fastener is a retaining ring.

11. The brake safety apparatus of claim 8, wherein the fastener is a screw.

12. The brake safety apparatus of claim 8, wherein the preload is set for a subject of about 100 lbs weight.

13. The brake safety apparatus of claim 8, wherein the spring rate is selected to retain about 95% of the maximum safe braking power.

14. The brake safety apparatus of claim 8, wherein the second cable housing is a brake caliper noodle of a linear pull brake system.

15. A brake safety apparatus comprising:

a piston couplable to a first cable housing of a brake cable, wherein said brake cable is coupled at a first end to a brake lever and at a second end to a brake caliper system;

a spring with a predetermined spring rate and a preload;

a housing with a lumen running from its proximal end to its distal end, wherein said housing is configured to snugly couple to a second cable housing at its proximal end, wherein the spring and the piston are located within the lumen with the piston abutting the distal end of the spring, wherein the lumen is of sufficient length to allow full compression of the spring while retaining a full stroke of the brake lever; and a fastener securing the piston and spring within the housing.

16. The brake safety apparatus of claim 15, wherein the fastener is a locking star washer.

17. The brake safety apparatus of claim 15, wherein the fastener is a retaining ring.

18. The brake safety apparatus of claim 15, wherein the preload is set for a subject of about 100 lbs weight.

19. The brake safety apparatus of claim 15, wherein the spring rate is selected to retain about 95% of the maximum safe braking power.

20. The brake safety apparatus of claim 15, wherein the second cable housing is a brake caliper noodle of a linear pull brake system.

* * * * *